US009488984B1

(12) United States Patent
Williams et al.

(10) Patent No.: US 9,488,984 B1
(45) Date of Patent: Nov. 8, 2016

(54) METHOD, DEVICE AND SYSTEM FOR NAVIGATION OF AN AUTONOMOUS SUPPLY CHAIN NODE VEHICLE IN A STORAGE CENTER USING VIRTUAL IMAGE-CODE TAPE

(71) Applicants: Jeff Williams, El cerrito, CA (US); Ravi Bhaskaran, San Francisco, CA (US); Charlie Martin, Walnut Creek, CA (US)

(72) Inventors: Jeff Williams, El cerrito, CA (US); Ravi Bhaskaran, San Francisco, CA (US); Charlie Martin, Walnut Creek, CA (US)

( * ) Notice: Subject to any disclaimer, the term of this patent is extended or adjusted under 35 U.S.C. 154(b) by 0 days.

(21) Appl. No.: 15/072,360

(22) Filed: Mar. 17, 2016

(51) Int. Cl.
| | |
|---|---|
| *G06K 9/00* | (2006.01) |
| *G05D 1/00* | (2006.01) |
| *G06K 9/62* | (2006.01) |
| *H04N 5/225* | (2006.01) |
| *G06K 9/46* | (2006.01) |
| *H04N 5/33* | (2006.01) |
| *G06T 7/20* | (2006.01) |
| *H04N 5/247* | (2006.01) |
| *G06K 9/20* | (2006.01) |
| *G05D 1/02* | (2006.01) |
| *G08G 3/00* | (2006.01) |

(52) U.S. Cl.
CPC .......... *G05D 1/0088* (2013.01); *G05D 1/0221* (2013.01); *G05D 1/0246* (2013.01); *G06K 9/00805* (2013.01); *G06K 9/20* (2013.01); *G06K 9/46* (2013.01); *G06K 9/6202* (2013.01); *G06T 7/20* (2013.01); *H04N 5/2256* (2013.01); *H04N 5/247* (2013.01); *H04N 5/332* (2013.01); *G06K 2009/2045* (2013.01); *G06T 2207/20081* (2013.01); *G06T 2207/30241* (2013.01); *G06T 2207/30261* (2013.01)

(58) Field of Classification Search
CPC . G06K 9/00; G06T 2207/30268; H04N 5/00
USPC ........ 382/104; 340/901, 933, 938, 985, 988; 701/400, 460, 467
See application file for complete search history.

(56) References Cited

U.S. PATENT DOCUMENTS 9,098,080 B2 * 8/2015 Norris ..................... H04L 67/12

* cited by examiner

*Primary Examiner* — Abolfazl Tabatabai
(74) *Attorney, Agent, or Firm* — Raj Abhyanker, P.C.

(57) ABSTRACT

Disclosed are a method, device and system for navigation of an autonomous supply chain node vehicle in a storage center using virtual image-code tape. In one aspect, a layout diagram with a set of shelves is analyzed. A trajectory for movement of the autonomous supply chain node vehicle avoiding the shelves is determined. A training set of discrete overlapping images of peripheral area along the trajectory is captured with an imaging device on the autonomous supply chain node vehicle in a learning mode. A virtual image-code tape capturing a continuous area of storage center with globally unique identifiers (GUIDs) associated with the peripheral area is generated. The GUIDs include spatial information and identifiable image features from the training set capturing floor marks. An operating set of discrete overlapping images is captured in a normal mode and compared with GUIDs of the virtual image-code tape to determine a current location.

20 Claims, 20 Drawing Sheets

METHOD, DEVICE AND SYSTEM FOR NAVIGATION OF AN AUTONOMOUS SUPPLY CHAIN NODE VEHICLE IN A STORAGE CENTER USING VIRTUAL IMAGE-CODE TAPE

FIELD OF TECHNOLOGY

This disclosure relates generally to the field of robotics, and more particularly to a method, device and system for navigation of an autonomous supply chain node vehicle in a storage center using virtual image-code tape.

BACKGROUND

A storage center (e.g., a supply chain node, a distribution center, a warehouse, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center) may be a physical space in which inventory (e.g., products) are stored for delivery and/or sale to retailers and/or consumers. The storage center may allow a single location to stock multiple products. Some organizations may operate distribution, wholesale, retail, and/or direct-to-consumer distribution in a single storage center to share investments (e.g., in space, equipment, labor resources, and/or inventory as applicable).

The storage center may have several main areas: a receiving dock, a storage or retail area, and/or a shipping dock. The storage center may have a series of rows having stacked shelving, with aisles between them. An inventory management system (e.g., WMS (warehouse management system)) may be used to identify and track inventory and locations in the storage center. Items may be tracked or transported using supply chain node vehicles (e.g., forklift trucks, pallet jacks, warehouse vehicles, transport vehicles, trolleys, or inventory tracking vehicles with cameras or sensors) from the receiving dock to the shelves in the storage area, from the shelves in the storage area to the shipping dock, and/or among shelves. The operation of supply chain node vehicles may be labor intensive and may require skilled workers. Hiring such skilled workers can be challenging and time consuming. New workers may take significant time to acquire the skill to operate the supply chain node vehicles safely, effectively and efficiently, leading to higher cost. Human fatigue after long intense working hours may elevate the possibility of workplace accidents.

Merchants and distributors may keep track of items stored in stacked shelving based on shelf number, row number, column number, and/or relative position. Workers in the storage center seeking to find inventory to fulfill a particular request may spend added time in finding needed items. Workers may need to manually look at a map, discern the labels of each product, and/or search for products on shelves by reading individual labels. This may be time consuming and inefficient. When a new worker is employed, it may take time for them to develop a mental map of the storage center. It may take time for them to locate the aisles and the shelf storing the inventory. This may increase cost. Further, such manual processes may be error prone because they may depend on human labor. Misplaced items due to error may be difficult and time consuming to find. Relabeling and/or rerouting of the storage center to accommodate customized solutions may be difficult to modify, inefficient, expensive, and/or cost prohibitive.

Using an autonomous supply chain node vehicle (e.g. autonomous forklift and/or autonomous robot) that may navigate in the storage center may alleviate some issues, at least partially.

SUMMARY

Disclosed are a method, device, and/or system for navigation of an autonomous supply chain node vehicle in a storage center using virtual image-code tape.

In one aspect, a method includes analyzing a layout diagram of a storage center using a central inventory server with a central processor, a central memory and a set of central instructions. The method determines that the layout diagram includes a set of shelves. It further determines a trajectory in the layout diagram for a movement of an autonomous supply chain node vehicle in the storage center avoiding the set of shelves. A number of portions of the trajectory are each locally parallel to and within a distance constraint with respect to an adjacent shelf.

The central inventory server is communicatively connected with the autonomous supply chain node vehicle. The autonomous supply chain node vehicle has an embedded processor, an embedded memory and a set of embedded instructions. A training set of discrete overlapping images of a peripheral area along the trajectory is captured with an imaging device on the autonomous supply chain node vehicle in a learning mode of the autonomous supply chain node vehicle.

The training set of discrete overlapping images is processed using the autonomous supply chain node vehicle and the central inventory server in the learning mode of the autonomous supply chain node vehicle to generate a virtual image-code tape capturing a continuous area of the storage center. A set of globally unique identifiers (GUIDs) is associated with the peripheral area along the trajectory. The set of GUIDs includes identifiable image features associated with the training set of discrete overlapping images and a set of spatial information of the identifiable image features in the storage center.

An operating set of discrete overlapping images of the peripheral area is captured around the autonomous supply chain node vehicle with the imaging device in a normal mode of the autonomous supply chain node vehicle. The operating set of discrete overlapping images is processed in the normal mode of the autonomous supply chain node vehicle using the autonomous supply chain node vehicle and the central inventory server. In the normal mode, associated identifiable image features are compared with the set of GUIDs of the virtual image-code tape to determine a current location of the autonomous supply chain node vehicle. The current location may be with respect to the trajectory. In the normal mode, the autonomous supply chain node vehicle is directed to reposition and/or move with respect to the trajectory based on the current location of the autonomous supply chain node vehicle. The current location may be with respect to the trajectory.

The imaging device may use an illuminating device to provide illumination for the imaging device. The imaging device may include imaging sensors to capture the set of discrete overlapping images using visible light, infra-red, ultra-violet, microwave, sound, ultra sound, radar, laser, shock wave, mechanical vibration, and/or other electromagnetic radiation in at least one band in a frequency spectrum. The illuminating device may include energy sources to emit visible light, infra-red, ultra-violet, microwave, sound, ultra sound, radar, laser, shock wave, mechanical vibration, and/or the other electromagnetic radiation in the at least one band in the frequency spectrum.

The imaging device may capture down-view images of a floor with a set of floor artificial calibration marks, a set of floor artificial trajectory road signs, and/or a set of floor texture marks. The set of floor texture marks may include scratch marks, swirl marks, scuff marks, stains, grease traces, debris, dirt patterns, tape marks, footprints, shoeprints, dye marks, rubber marks, depression marks, junctions, floor cracks, wood grains, carpet textures, vinyl patterns, concrete grains, tile patterns, floor signages, floor arts, exposed hardware parts, shadows and/or shades.

The imaging device may also capture side-view images of the shelves and/or side walls with a set of side artificial calibration marks, a set of side artificial trajectory road signs, and/or a set of side texture marks. The side texture marks may include shelves, structural features, wall texture, doors, windows, cables, furniture, tables, chairs, computers, air ducts, curtains, signages, boards, posters, displays, decorations, light fixtures, switches, shadows and/or shades.

The imaging device may further capture up-view images of the ceiling with a set of ceiling artificial calibration marks, a set of ceiling artificial trajectory road signs, and/or a set of ceiling texture marks. The ceiling texture marks may include structural features, beam features, smoke marks, fume marks, fire sprinklers, bells, windows, fans, switches, cables, light fixtures, cameras, signages, air ducts, water pipes, tiles, vents, WiFi routers, projectors, shadows and/or shades.

In any mode of the autonomous supply chain node vehicle, the method may include preprocessing the discrete overlapping images using a set of spatially varying preprocessing parameters before the processing. The preprocessing may include noise reduction, image cropping, image rectification, image resizing, color correction, image restoration, image enhancement, imaging device compensation, imaging device defect compensation, illumination compensation, intensity compensation, high dynamic range processing, and/or geometric compensation.

The method may process any set of discrete overlapping images in any mode of the autonomous supply chain node vehicle. Extraction, combination, representation, coding and/or comparing of associated identifiable image features may be performed. Feature extraction, edge detection, image matching, predictive matching, image fusion, image stitching, image sprite forming, panoramic photography, feature encoding, feature compression, and/or robust processing may be used. It may use a set of spatially varying processing parameters.

The set of spatially varying preprocessing parameters and the set of spatially varying processing parameters may be spatially varying according to a location history of the autonomous supply chain node vehicle, a classification of the autonomous supply chain node vehicle, a state of the autonomous supply chain node vehicle, a type of the imaging device, a state of the imaging device, a type of the illuminating device, a state of the illuminating device, and/or a condition of the storage center.

In any mode of the autonomous supply chain node vehicle, the method may further include accelerating the processing of a current captured image. The current captured image may be compared with a set of past captured images that overlap with the current captured image. An overlapping region of the current captured image that overlaps with any of the set of past captured images may be identified. A corresponding non-overlapping region of the current captured image may also be identified. The method may determine that a subset of the set of GUIDs of the virtual image-code tape is associated with identifiable image features of the set of past captured images.

A prediction of identifiable image features of the current captured image may be generated based on identifiable image features of the set of past captured images, the set of GUIDs of the virtual image-code tape and/or a location history of the autonomous supply chain node vehicle. Simplified processing may be performed on the non-overlapping region and/or ultra-simplified processing (simpler than the simplified processing) may be performed on the overlapping region, based on the prediction of identifiable image features of the current captured image.

The method may further direct the autonomous supply chain node vehicle to compare associated identifiable image features of the operating set of discrete overlapping images with the set of GUIDs of a virtual image-code tape. The autonomous supply chain node vehicle may be directed to detect any deviation of the autonomous supply chain node vehicle from the trajectory according to the comparison result. The autonomous supply chain node vehicle may be directed to move towards the trajectory when an unintentional deviation from the trajectory is detected.

The method may detect obstacle(s) using an obstacle sensor. The autonomous supply chain node vehicle may deviate intentionally from the trajectory temporarily to avoid obstacles along the trajectory when such obstacles are detected by the obstacle sensor. The virtual image-code tape may be updated with a subset of the operating set of discrete overlapping images captured during any deviation from the trajectory.

The autonomous supply chain node vehicle may be directed to change from the normal mode to a cautious mode when a current subset of the operating set of discrete overlapping images is determined to be unfamiliar, with significant mismatch between the associated identifiable image features and the set of GUIDs of the virtual image-code tape. In the cautious mode, sensitivity level of an obstacle sensor may be set to high. The current location may be analyzed based on the location history of the autonomous supply chain node vehicle, an estimated velocity of the autonomous supply chain node vehicle, the virtual image-code tape, the layout diagram, the set of artificial calibration marks, and/or the set of artificial trajectory road signs. The autonomous supply chain node vehicle may be directed to reposition and/or move at a slower pace based on the current location, and/or the trajectory.

The autonomous supply chain node vehicle may be directed to change from the cautious mode to a lost mode after operating in the cautious mode for a timeout period. In the lost mode, a user may be alerted about the autonomous supply chain node vehicle being lost. Sensitivity levels of the obstacle sensor may be increased. Any nearby obstacles may be detected using the obstacle sensor. The autonomous supply chain node vehicle may reposition slowly and may stop.

The autonomous supply chain node vehicle may be directed to change from the lost mode and/or the cautious mode to the normal mode when a subsequent subset of the operating set of discrete overlapping images is determined to be familiar, with sufficient similarity between the associated identifiable image features and/or the set of GUIDs of the virtual image-code tape. In the normal mode, the sensitivity level of the obstacle sensor may be set to normal. The autonomous supply chain node vehicle may reposition and/or move at a normal pace.

The method may further change from any one of the normal mode, the cautious mode, and/or the lost mode to the learning mode when directed by the user. The method may determine an alternative trajectory with a sweeping zigzag coverage of an area comprising both a left region and/or a right region of the trajectory. The autonomous supply chain node vehicle may be directed to move along the alternative trajectory. The virtual image-code tape may be updated with a subset of a set of discrete overlapping images captured while on the alternative trajectory. The virtual image-code tape may also be updated with a subset of the set of discrete overlapping images captured during a period indicated by the user. The virtual image-code tape may be re-generated with another subset of the set of discrete overlapping images captured during another period indicated by the user.

The method may further include sharing the virtual image-code tape with another autonomous supply chain node vehicle communicatively connected with the autonomous supply chain node vehicle, and/or a mobile device communicatively connected with the autonomous supply chain node vehicle. The autonomous supply chain node vehicle may generate, update and/or regenerate the virtual image-code tape jointly with another autonomous supply chain node vehicle and/or the mobile device.

In another aspect, a central inventory server includes a central processor, a central memory communicatively connected with the central processor and a set of central instructions to be executed through the central processor using the central memory. The central inventory server analyzes a layout diagram of a storage center (e.g., a supply chain node, a distribution center, a warehouse, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center). A central inventory server determines that the layout diagram includes a set of shelves. A path is determined in the layout diagram for a movement of an autonomous supply chain node vehicle in the storage center avoiding the set of shelves. A number of portions of the path are each locally parallel to and within a distance constraint with respect to an adjacent shelf.

The central inventory server communicatively connects with the autonomous supply chain node vehicle and directs it to capture a training set of discrete overlapping images of the peripheral area along the path with an imaging device on the autonomous supply chain node vehicle. An operating set of discrete overlapping images of the peripheral area is captured around the autonomous supply chain node vehicle with the imaging device. The autonomous supply chain node vehicle is directed to move and/or reposition with respect to the path, based on a current position of the autonomous supply chain node vehicle.

The central inventory server processes the training set of discrete overlapping images jointly with the autonomous supply chain node vehicle to generate a virtual image-code tape capturing a continuous area of the storage center with a set of globally unique identifiers (GUIDs) associated with the peripheral area along the path. The set of GUIDs includes identifiable image features associated with the training set of discrete overlapping images and a set of spatial information of the identifiable image features in the storage center. The operating set of discrete overlapping images is processed to compare associated identifiable image features with the set of GUIDs of the virtual image-code tape to determine the current position of the autonomous supply chain node vehicle.

In yet another aspect, an autonomous supply chain node vehicle includes a vehicle that can move, with an imaging device on the vehicle. The autonomous supply chain node vehicle includes a processor (e.g., an embedded processor), a memory (e.g., an embedded memory) communicatively connected with the processor, and a set of instructions (e.g., embedded instructions) to be executed through the processor (e.g., the embedded processor) using the memory (e.g., the embedded memory). The set of instructions (e.g., embedded instructions) directs the autonomous supply chain node vehicle to communicatively connect with a central inventory server. The autonomous supply chain node vehicle determines that a layout diagram of a storage center (e.g., a supply chain node, a distribution center, a warehouse, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center) includes a set of furniture (e.g., movable objects, set of shelves) and fixtures (e.g., fixed objects, set of shelves). A path is determined for a movement of the autonomous supply chain node vehicle in the storage center avoiding the set of furniture and fixtures.

The autonomous supply chain node vehicle captures a training set of discrete overlapping images of the peripheral area along the path with the imaging device. It processes the training set of discrete overlapping images jointly with the central inventory server to generate a virtual image-code tape. The virtual image-code tape captures a continuous area of the storage center with a set of globally unique identifiers (GUIDs) associated with the peripheral area along the path. The set of GUIDs includes identifiable image features associated with the training set of discrete overlapping images and a set of spatial information of the identifiable image features in the storage center.

The autonomous supply chain node vehicle captures an operating set of discrete overlapping images of the peripheral area around the autonomous supply chain node vehicle with the imaging device. It processes the operating set of discrete overlapping images jointly with the central inventory server to compare associated identifiable image features with the set of GUIDs of the virtual image-code tape to determine a current position of the autonomous supply chain node vehicle. The autonomous supply chain node vehicle moves with respect to the path based on the current position of the autonomous supply chain node vehicle.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
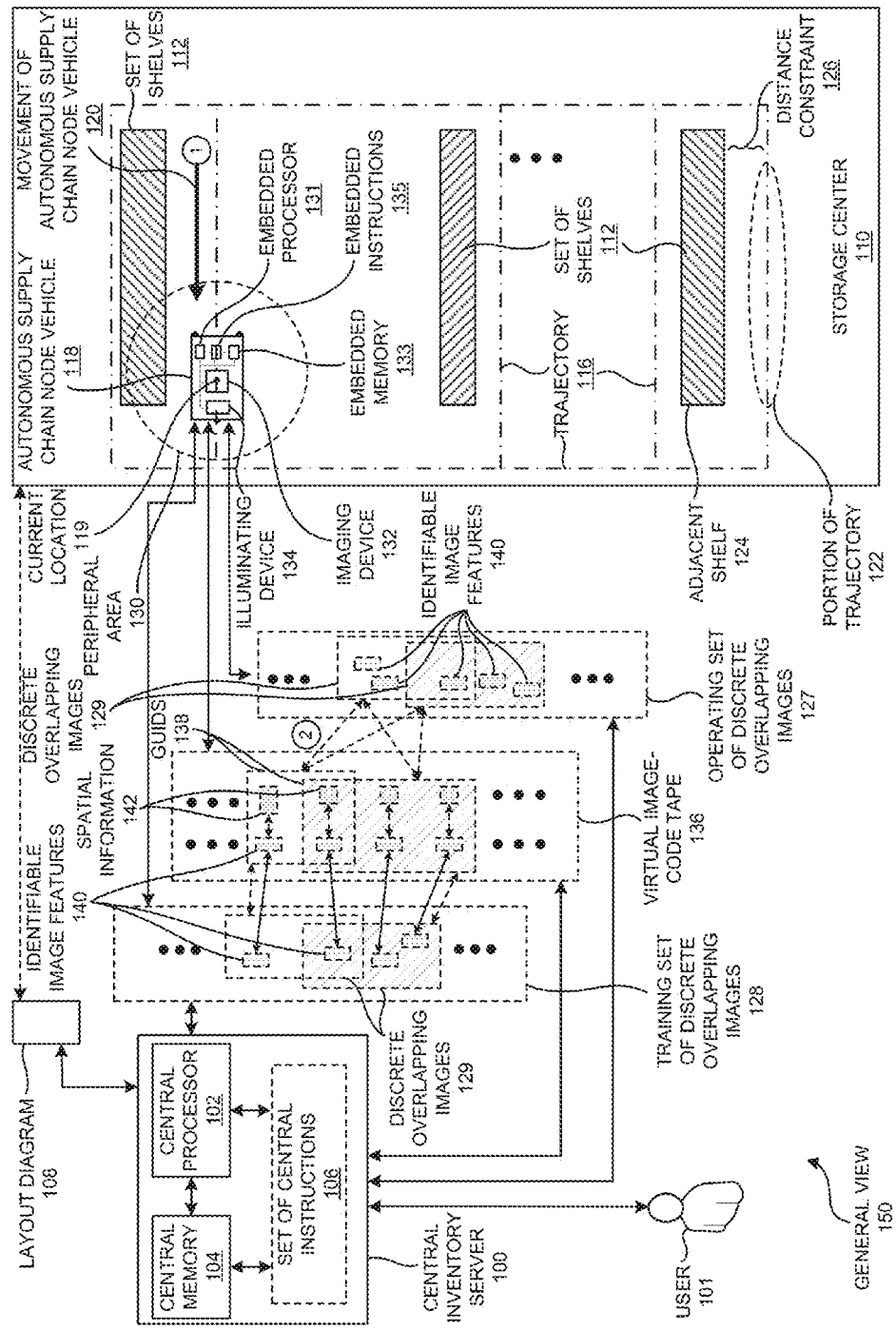
FIG. 1 is a general view of a method, device and system for navigation of an autonomous supply chain node vehicle in a storage center using a virtual image-code tape, according to one embodiment.

Other features of the present embodiments will be apparent from the accompanying drawings and from the detailed description that follows.

DETAILED DESCRIPTION

Example embodiments, as described below, may be used to provide a method, device and system for navigation of an autonomous supply chain node vehicle in a storage center using virtual image-code tape. Although, the present embodiments have been described with reference to specific example embodiments, it will be evident that various modifications and changes may be made to these embodiments without departing from the broader spirit and scope of the various embodiments.

In one embodiment, a method includes analyzing a layout diagram 108 of a storage center 110 using a central inventory server 100 with a central processor 102, a central memory 104 and a set of central instructions 106. The method determines that the layout diagram 108 includes a set of shelves 112. It further determines a trajectory 116 in the layout diagram 108 for a movement of an autonomous supply chain node vehicle 120 in the storage center 110 avoiding the set of shelves 112. A number of portions of the trajectory 116 (e.g., the portion of trajectory 122) are each locally parallel to and within a distance constraint 126 with respect to an adjacent shelf 124.

The central inventory server 100 is communicatively connected with the autonomous supply chain node vehicle 118. The autonomous supply chain node vehicle 118 has an embedded processor 131, an embedded memory 133 and a set of embedded instructions 135. A training set of discrete overlapping images 128 of a peripheral area 130 along the trajectory 116 is captured with an imaging device 132 on the autonomous supply chain node vehicle 118 in a learning mode 1500 of the autonomous supply chain node vehicle 118.

The training set of discrete overlapping images 128 is processed using the autonomous supply chain node vehicle 118 and the central inventory server 100 in the learning mode 1500 of the autonomous supply chain node vehicle 118 to generate a virtual image-code tape 136 capturing a continuous area along the trajectory 600 of the storage center 110. A set of globally unique identifiers (GUIDs) 138 is associated with the peripheral area 130 along the trajectory 116. The set of GUIDs 138 includes identifiable image features 140 associated with the training set of discrete overlapping images 128 and a set of spatial information 142 of the identifiable image features 140 in the storage center 110.

An operating set of discrete overlapping images 127 of the peripheral area 130 is captured around the autonomous supply chain node vehicle 118 with the imaging device 132 in a normal mode 1502 of the autonomous supply chain node vehicle 118. The operating set of discrete overlapping images 127 is processed in the normal mode 1502 of the autonomous supply chain node vehicle 118 using the autonomous supply chain node vehicle 118 and the central inventory server 100. In the normal mode 1502, associated identifiable image features 140 are compared with the set of GUIDs 138 of the virtual image-code tape 136 to determine a current location 119 of the autonomous supply chain node vehicle 118. The current location 119 may be with respect to the trajectory 116 in the normal mode 1502. In the normal mode 1502, the autonomous supply chain node vehicle 118 is directed to reposition and/or move 120 (e.g., circle "1") with respect to the trajectory 116 based on the current location 119 of the autonomous supply chain node vehicle 118 in the normal mode 1502 of the autonomous supply chain node vehicle 118.

The imaging device 132 may use an illuminating device 134 to provide illumination for the imaging device 132. The imaging device 132 may include imaging sensor(s) 226 to capture the set of discrete overlapping images 129 using visible light 200, infra-red 202, ultra-violet 204, microwave 206, sound 208, ultra-sound 210, radar 212, laser 214, shock wave 216, mechanical vibration 218, and/or other electromagnetic radiation 220 in at least one band in a frequency spectrum. The illuminating device 134 may include energy source(s) 224 to emit visible light 200, infra-red 202, ultra-violet 204, microwave 206, sound 208, ultra-sound 210, radar 212, laser 214, shock wave 216, mechanical vibration 218, and/or the other electromagnetic radiation 220 in the at least one band in the frequency spectrum.

The imaging device 132 may capture down-view images of a floor 300A with a set of floor artificial calibration marks 302A, a set of floor artificial trajectory road signs 304A, and/or a set of floor texture marks 306A. The set of floor texture marks 306A may include scratch marks, swirl marks, scuff marks, stains, grease traces, debris, dirt patterns, tape marks, footprints, shoeprints, dye marks, rubber marks, depression marks, junctions, floor cracks, wood grains, carpet textures, vinyl patterns, concrete grains, tile patterns, floor signages, floor arts, exposed hardware parts, shadows and/or shades.

The imaging device 132 may also capture side-view images of the shelves and side walls 300B with a set of side artificial calibration marks 302B, a set of side artificial trajectory road signs 304B, and/or a set of side texture marks 306B. The side texture marks 306B may include shelves, structural features, wall texture, doors, windows, cables, furniture, tables, chairs, computers, air ducts, curtains, signages, boards, posters, displays, decorations, light fixtures, switches, shadows and/or shades.

The imaging device 132 may further capture up-view images of the ceiling 300C with a set of ceiling artificial calibration marks 302C, a set of ceiling artificial trajectory road signs 304C, and/or a set of ceiling texture marks 306C. The ceiling texture marks 306C may include structural features, beam features, smoke marks, fume marks, fire sprinklers, bells, windows, fans, switches, cables, light fixtures, cameras, signages, air ducts, water pipes, tiles, vents, WiFi routers, projectors, shadows and/or shades.

In any mode 1500, 1502, 1504, 1506 of the autonomous supply chain node vehicle 118, the method may include preprocessing 500 the discrete overlapping images 129 using a set of spatially varying preprocessing parameters before the processing 502. The preprocessing 500 may include noise reduction, image cropping, image rectification, image resizing, color correction, image restoration, image enhancement, imaging device compensation, imaging device defect compensation, illumination compensation, intensity compensation, high dynamic range processing, and/or geometric compensation.

The method may process any set of discrete overlapping images 129 in any mode of the autonomous supply chain node vehicle 118. The processing 502 may include extraction, combination, representation, coding and/or comparing of associated identifiable image features 140. The processing 502 may also include feature extraction, edge detection, image matching, predictive matching, image fusion, image stitching, image sprite forming, panoramic photography, feature encoding, feature compression, and robust processing may be used. The processing 502 may use a set of spatially varying processing parameters.

The set of spatially varying preprocessing parameters and the set of spatially varying processing parameters may be spatially varying according to a location history of the autonomous supply chain node vehicle 118, a classification of the autonomous supply chain node vehicle 118, a state of the autonomous supply chain node vehicle 118, a type of the imaging device 132, a state of the imaging device 132, a type of the illuminating device 134, a state of the illuminating device 134, and/or a condition of the storage center 110.

In any mode of the autonomous supply chain node vehicle 118, the method may further include accelerating the processing 502 of a current captured image 604. The current captured image 604 may be compared with a set of past captured images 606A-606B that overlap with the current captured image 604. An overlapping region 608 of the current captured image 604 that overlaps with any of the set of past captured images 606A-606B and/or a corresponding non-overlapping region 616 of the current captured image 604 may be identified. The method may determine that a subset (e.g., 612A and/or 612B) of the set of GUIDs 138 of the virtual image-code tape 136 is associated with the identifiable image features 140 of the set of past captured images 606A-606B.

A prediction (e.g., prediction for current captured image 614) of identifiable image features 140 of the current captured image 604 may be generated based on identifiable image features 140 of the set of past captured images 606A-606B, the set of GUIDs 138 of the virtual image-code tape 136 and/or a location history of the autonomous supply chain node vehicle 118. Simplified processing may be performed on the non-overlapping region 616 and/or ultra-simplified processing (simpler than the simplified processing) may be performed on the overlapping region 608 based on the prediction (e.g., prediction for current captured image 614) of identifiable image features 140 of the current captured image 604.

The method may further direct the autonomous supply chain node vehicle 118 to compare associated identifiable image features 140 of the operating set of discrete overlapping images 127 with the set of GUIDs 138 of a virtual image-code tape 136. The autonomous supply chain node vehicle 118 may be directed to detect any deviation (e.g., 700) of the autonomous supply chain node vehicle 118 from the trajectory 116 according to the comparison result. The autonomous supply chain node vehicle 118 may be directed to move towards the trajectory 116 when an unintentional deviation from the trajectory 700 is detected.

The method may detect obstacle(s) using an obstacle sensor 802. The autonomous supply chain node vehicle 118 may deviate intentionally from the trajectory 116 temporarily to avoid obstacles along the trajectory 800 when such obstacles are detected by the obstacle sensor 802. The virtual image-code tape 136 may be updated (e.g., images captured during intentional deviation to update virtual image-code tape 806) with a subset of the operating set of discrete overlapping images 127 captured during any deviation from the trajectory 116.

The autonomous supply chain node vehicle 118 may be directed to change from the normal mode 1502 to a cautious mode 1504 when a current subset of the operating set of discrete overlapping images 127 is determined to be unfamiliar, with significant mismatch between the associated identifiable image features 140 and the set of GUIDs 138 of the virtual image-code tape 136. Sensitivity level of an obstacle sensor 802 may be set to high.

The current location 119 may be analyzed based on the location history of the autonomous supply chain node vehicle 118, an estimated velocity of the autonomous supply chain node vehicle 118, the virtual image-code tape 136, the layout diagram 108, the set of artificial calibration marks 302A-302C, and/or the set of artificial trajectory road signs 304A-304C. The autonomous supply chain node vehicle 118 may be directed to reposition and/or move 120 at a slower pace based on the current location, and/or the trajectory 116.

The autonomous supply chain node vehicle 118 may be directed to change from the cautious mode 1504 to a lost mode 1506 after operating in the cautious mode 1504 for a timeout period. In the lost mode 1506, a user 101 may be alerted about the autonomous supply chain node vehicle 118 being lost. Sensitivity levels of the obstacle sensor 802 may be increased. Any nearby obstacles may be identified using the obstacle sensor 802. The autonomous supply chain node vehicle 118 may reposition slowly, and/or may stop.

The autonomous supply chain node vehicle 118 vehicle may be directed to change from the lost mode 1506 and/or the cautious mode 1504 to the normal mode 1502 when a subsequent subset of the operating set of discrete overlapping images 127 is determined to be familiar, with sufficient similarity between the associated identifiable image features 140 and/or the set of GUIDs 138 of the virtual image-code tape 136. In the normal mode 1502, the sensitivity level of the obstacle sensor 802 may be set to normal. The autonomous supply chain node vehicle 118 may reposition and/or move 120 at a normal pace.

The autonomous supply chain node vehicle 118 may further change from any one of the normal mode 1502, the cautious mode 1504, and/or the lost mode 1506 to the learning mode 1500 when directed by the user 101.

The method may further include determining an alternative trajectory 900 with a sweeping zigzag coverage of an area comprising both a left region of the trajectory 902 and/or a right region of the trajectory 904. The autonomous supply chain node vehicle 118 may be directed to move along the alternative trajectory 900. The virtual image-code tape 136 may be updated with a subset of a set of discrete overlapping images 129 captured while on the alternative trajectory 900. The virtual image-code tape 136 may be updated (e.g., images captured during alternative trajectory 900 to update virtual image-code tape 906) with a subset of the set of discrete overlapping images 129 captured during a period indicated by a user 101 (e.g., subset of images captured during a period indicated by user 1000). The virtual image-code tape 136 may be re-generated with another subset of the set of discrete overlapping images 129 captured during another period indicated by the user 101 (e.g., another subset of images captured during a period indicated by user 1006).

The method may further include sharing the virtual image-code tape 136 with another autonomous supply chain node vehicle 1100 and/or a mobile device 1102 communicatively connected with the autonomous supply chain node vehicle 118. The autonomous supply chain node vehicle 118 may generate, update and/or regenerate the virtual image-code tape 136 jointly with another autonomous supply chain node vehicle 1100 and/or the mobile device 1102.

In another embodiment, a central inventory server 100 includes a processor (e.g., a central processor 102), a memory (e.g., a central memory 104) communicatively connected with the processor (e.g., the central processor 102) and a set of instructions (e.g., set of central instructions 106) to be executed through the processor (e.g., the central processor 102) using the memory (e.g., the central memory 104). The central inventory server 100 analyzes a layout diagram 108 of a storage center 110 (e.g., a distribution center, a supply chain node, a warehouse, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center). A central inventory server 100 determines that the layout diagram 108 includes a set of shelves 112. A path (e.g., trajectory 116) is determined in the layout diagram 108 for a movement of an autonomous supply chain node vehicle 120 in the storage center 110 (e.g., a distribution center, a supply chain node, a warehouse, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center) avoiding the set of shelves 112, with a number of portions of the path (e.g., the portion of trajectory 122) each locally parallel to and within a distance constraint 126 with respect to an adjacent shelf 124.

The central inventory server 100 communicatively connects with the autonomous supply chain node vehicle 118 and directs the autonomous supply chain node vehicle 118 to capture a training set of discrete overlapping images 128 of a peripheral area 130 along the path (e.g., trajectory 116) with an imaging device 132 on the autonomous supply chain node vehicle 118. An operating set of discrete overlapping images 127 of the peripheral area 130 is captured around the autonomous supply chain node vehicle 118 with the imaging device 132. The autonomous supply chain node vehicle 118 is directed to reposition and/or move 120 with respect to the path (e.g., trajectory 116), based on a current position (e.g., current location 119) of the autonomous supply chain node vehicle 118.

The central inventory server processes the training set of discrete overlapping images 128 jointly with the autonomous supply chain node vehicle 118 to generate a virtual image-code tape 136 capturing a continuous area along the trajectory 600 in the storage center 110 (e.g., a supply chain node, a distribution center, a warehouse, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center) with a set of globally unique identifiers (GUIDs) 138 associated with the peripheral area 130 along the path (e.g., trajectory 116). The set of GUIDs 138 includes identifiable image features 140 associated with the training set of discrete overlapping images 128 and a set of spatial information 142 of the identifiable image features 140 in the storage center 110 (e.g., a supply chain node, a warehouse, a distribution center, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center). The operating set of discrete overlapping images 127 is processed to compare associated identifiable image features 140 with the set of GUIDs 138 of the virtual image-code tape 136 to determine the current position (e.g., current location 119) of the autonomous supply chain node vehicle 118 with respect to the path (e.g., trajectory 116).

In yet another embodiment, an autonomous supply chain node vehicle 118 includes a vehicle that can move, with an imaging device 132 on the vehicle. The autonomous supply chain node vehicle 118 includes a processor (e.g., an embedded processor 131), a memory (e.g., an embedded memory 133) communicatively connected with the processor (e.g., embedded processor 131), and a set of instructions (e.g., embedded instructions 135) to be executed through the processor (e.g., the embedded processor 131) using the memory (e.g., the embedded memory 133). The set of instructions (e.g., embedded instructions 135) directs the autonomous supply chain node vehicle 118 to communicatively connect with a central inventory server 100. The autonomous supply chain node vehicle 118 determines that a layout diagram (e.g., layout diagram 108 of storage center 110) of a storage center 110 (e.g., a supply chain node, a distribution center, a warehouse, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center) includes a set of furniture (e.g., movable objects, set of shelves 112) and fixtures (e.g., fixed objects, set of shelves 112). A path (e.g., trajectory 116) is determined for a movement of the autonomous supply chain node vehicle 120 in the storage center 110 (e.g., a supply chain node, a distribution center, a warehouse, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center) avoiding the set of furniture and fixtures (e.g., set of shelves 112).

The autonomous supply chain node vehicle 118 captures a training set of discrete overlapping images 128 of the peripheral area 130 along the path (e.g., trajectory 116) with the imaging device 132. The autonomous supply chain node vehicle 118 processes the training set of discrete overlapping images 128 jointly with the central inventory server 100 to generate a virtual image-code tape 136. The virtual image-code tape 136 captures a continuous area (e.g., continuous area along the trajectory 600) of the storage center 110 (e.g., a supply chain node, a distribution center, a warehouse, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center) with a set of globally unique identifiers (GUIDs) 138 associated with the peripheral area 130 along the path (e.g., trajectory 116). The set of GUIDs 138 includes identifiable image features 140 associated with the training set of discrete overlapping images 128 and a set of spatial information 142 of the identifiable image features 140 in the storage center 110 (e.g., a supply chain node, a distribution center, a warehouse, a storage facility, a fulfillment center, a cross-dock facility, a bulk break center, an unstructured storage area, a wholesale store, a wholesale-style store, a membership warehouse club, a retail store, a departmental store, a supermarket, a grocery store, a manufacturing facility, and/or a package handling center).

The autonomous supply chain node vehicle 118 captures an operating set of discrete overlapping images 127 of the peripheral area 130 around the autonomous supply chain node vehicle 118 with the imaging device 132. The autonomous supply chain node vehicle 118 processes the operating set of discrete overlapping images 127 jointly with the central inventory server 100 to compare associated identifiable image features 140 with the set of GUIDs 138 of the virtual image-code tape 136 to determine a current position (e.g., current location 119) of the autonomous supply chain node vehicle 118. The autonomous supply chain node vehicle 118 repositions and/or moves with respect to the path (e.g., trajectory 116) based on the current position (e.g., current location 119) of the autonomous supply chain node vehicle 118.

FIG. 1 is a general view 150 of a method, device and system for navigation of an autonomous supply chain node vehicle 118 in a storage center 110 using virtual image-code tape 136, according to one embodiment.

Particularly, FIG. 1 shows a central inventory server 100, a user 101, a central processor 102, a central memory 104, a set of central instructions 106, a layout diagram 108, a storage center 110, a set of shelves 112, a trajectory 116, an autonomous supply chain node vehicle 118, a current location 119, a movement of the autonomous supply chain node vehicle 120, a portion of the trajectory 122, an adjacent shelf 124, a distance constraint 126, an operating set of discrete overlapping images 127, a training set of discrete overlapping images 128, discrete overlapping images 129, a peripheral area 130, an embedded processor 131, an imaging device 132, an embedded memory 133, an illuminating device 134, embedded instructions 135, a virtual image-code tape 136, a set of GUIDs 138, and identifiable image features 140 and a spatial information 142, according to one embodiment.

The central inventory server 100 may be a networked computer server, a general purpose computer, a notebook computer, a portable computing device, a special purpose computer, an embedded computer and/or a system of computers. It may be physically located in the storage center 110, or it may be in the cloud. The central inventory server 100 may contain at least the central processor 102, the central memory 104 and the set of central instructions 106. The central processor 102 may be a microprocessor, a microcontroller, a graphical processing unit (GPU), an application specific integrated circuit (ASIC), and/or a digital signal processor (DSP). It may contain more than one chip. It may contain one or more than one cores, according to one embodiment.

The user 101 may be an engineer, an operator, an officer, a manager, or other people. The central memory 104 may be a random access memory (RAM), a read-only memory (ROM), a flash ROM, a programmable ROM, an EPROM, an EEPROM, a flash memory, a hard disk, a magnetic disk, an optical disk, cloud storage and/or other kind of digital storage. The set of central instructions 106 may be written in various programming languages such as machine language, assembly language, C, C++, python, java, scripting language, etc., according to one embodiment.

The layout diagram 108 may contain a front view, a left view, a right view, a back view, and/or a top view of the overall storage center 110 and/or corresponding enlarged detailed views of various parts of the storage center 110. It may also contain 3-dimensional drawings, see-through views, cut-away views, cross-sections, and/or perspective drawings.

The storage center 110 may be a supply chain node, a distribution center, a warehouse, a storage facility, a fulfillment center, a cross-dock facility, a bulk break, an unstructured storage area, a wholesale store, a wholesale-style store, a membership warehouse club, a retail store, a departmental store, a supermarket, a grocery store, a manufacturing facility, and/or a package handling center. The storage center 110 may be a physical space in which inventory (e.g., products) are stored for delivery and/or sale to retailers and/or consumers. The storage center 110 may include an indoor facility and/or an outdoor facility. The storage center 110 may stock a large variety of products, each with different quantity according to some market forecasts and/or logistical plans. The products may be stored on set of shelves 112 in the storage center 110. Supply chain node vehicles (e.g., forklift trucks, pallet jacks, warehouse vehicles, trolleys, cars, trucks, containers) may be used to track, move, transport, load and/or unload products in the storage center 110. Some organization may operate wholesale, retail and/or direct-to-consumer distribution in the storage center 110. The storage center 110 may have three main areas: a receiving dock, a storage area, and a shipping dock. The layout plan of the storage center 110 may be recorded in a layout diagram 108 accessible to the central inventory server 100. As market forecasts and logistical plans change, the layout plan and thus the layout diagram 108 may change over time, according to one embodiment.

The storage center 110 may be a restaurant in which the set of shelves 112 may be a set of tables and chairs and the space between shelves (where the trajectory 116 resides) may be the walkway for customers and waiters/waitresses. The storage center 110 may be a building (e.g. a mall, a high school) in which the set of shelves 112 may be a set of rooms, stores, classrooms, activity rooms, gyms, cafeteria, etc, and the space between shelves (where the trajectory 116 resides) may be the walkway for customers/people/students, etc.

The set of shelves 112 in the storage area of the storage center 110 may contain rows of shelves at different height with different depth and different width to store the inventory. As market forecasts and logistical plans change, the arrangement and placement of the set of shelves 112 may change over time. As different inventory items may have different sizes, shapes, and quantities to be stored, the set of shelves 112 may be partitioned into segments. Each segment may be numbered and labeled. Barcode strips (e.g. continuous barcode tape 402, discrete barcode tape 408, infra-red pattern embedded discrete barcode 404, and/or infra-red pattern embedded continuous barcode 406) may be placed on the shelves to assist the inventory item check-in to and check-out of the segments of the set of shelves 112. As the market forecasts and logistic plans change, the quantity of shelves, the type of shelves, the placement and arrangement of the set of shelves 112 may be changed. The partitioning of the set of shelves 112 into segments may change over time, according to one embodiment.

The trajectory 116 may be a path allowing a user 101, a supply chain node vehicle and/or an autonomous supply chain node vehicle 118 to move from one point to another point within the storage center 110. It may be designed with enough clearance (e.g., distance constraint 126) such that supply chain node vehicles and the autonomous supply chain node vehicle(s) 118 can follow without hitting the shelves and other possible obstacles in the storage center 110. It may be designed such that some portions of the path may be wide enough to accommodate two or more autonomous supply chain node vehicle(s) 118. It may be designed to reduce labor cost in storing inventory items onto and retrieving from the shelves. The method defines the trajectory 116 for the autonomous supply chain node vehicle 118 to move around the storage center 110 along the trajectory 116 without hitting the set of shelves 112. The trajectory 116 may be a path on the floor of the storage center 110 that the autonomous supply chain node vehicle 118 can move along without hitting the shelves. Some and/or most portions of the trajectory 116 may be locally parallel to an adjacent shelf 124, according to one embodiment.

The autonomous supply chain node vehicle 118 may be an autonomous warehouse vehicle, an autonomous forklift, an autonomous pallet jack, an autonomous robot, and/or an autonomous trolley for transporting or tracking goods in the storage center 110. The autonomous supply chain node vehicle 118 may be a robot (e.g., with one or more robotic arms/limbs, robotic vision, sensors, actuators, and/or artificial intelligences) on wheels, legs, and/or other mechanism that may enable it to move around in the storage center 110. The autonomous supply chain node vehicle 118 may be push-carts allowing human to move it by pushing and/or pulling. It may also be a flying/hovering/levitating/suspending vehicle that can move around in the storage center 110. The autonomous supply chain node vehicle 118 may also be motorized so that it is self-powered to move. It may be powered by battery such that battery charging would be needed. It may also be powered by gasoline, liquefied natural gas, or other energy source. The autonomous supply chain node vehicle 118 may have one or more bins for storing inventory items temporarily while it moves around. The autonomous supply chain node vehicle 118 may have one or more robotic arms to pick up and place the inventory items. A human operator (or a user 101) may travel with the autonomous supply chain node vehicle 118 to a particular segment of a particular shelf (e.g., the set of shelves 112) to store or retrieve items. Alternatively, the human operator (or the user 101) may control the autonomous supply chain node vehicle 118 and/or the robotic arms remotely. The autonomous supply chain node vehicle 118 may have at least one imaging device 132 and/or at least one illuminating device 134 to capture a set of discrete overlapping images 129 of the peripheral area 130 (or surrounding area). The autonomous supply chain node vehicle 118 may also have an obstacle sensor 802 (e.g., infra-red) to detect possible obstacles in front of the autonomous supply chain node vehicle 118.

The current location 119 of the autonomous supply chain node vehicle 118 may be a coordinate within the storage center 110. It may also be a coordinate with respect to the trajectory 116. The coordinate may be 1-dimensional, 2-dimensional, 3-dimensional, or higher dimensional. The current location 119 may include direction of movement, velocity, acceleration, peripheral area information, obstacle information, etc. It may include any information that may assist the navigation of the autonomous supply chain node vehicle 118 in the storage center 110.

The movement of autonomous supply chain node vehicle 120 may be along the trajectory 116 allowing the autonomous supply chain node vehicle 118 to go to any point of interest in the storage center 110. The movement of autonomous supply chain node vehicle 120 may also be off the trajectory 116, intentionally or unintentionally. The distance constraint 126 may be with respect to one or more adjacent shelves 124. It may be with respect to one or more walls, partitions, furniture, fixture, obstacle, floor, ceiling, overhanging items, protruding items, etc. include spatial clearance constraint such as height, length, width, depth. The distance constraints 126 may be designed such that the autonomous supply chain node vehicle 118 may avoid the set of shelves 112, furniture, fixture and/or other obstacles, according to one embodiment.

The training set of discrete overlapping images 128 and the operating set of discrete overlapping images 127 may be captured using the imaging device 132 and/or the illuminating device 134 of the autonomous supply chain node vehicle 118. Part of the training set of discrete overlapping images 128 and/or part of the operating set of discrete overlapping images 127 may also be captured by an imaging device 132 of another autonomous supply chain node vehicle 1100, a mobile device 1102, surveillance cameras and other cameras in the storage center 110, and/or other capture devices. The discrete overlapping images 129 may include images captured from visible light cameras, infrared cameras, ultra-violet cameras, ultra-sound imaging devices, sonic imaging devices, etc. The discrete overlapping images 129 may have different resolution, capturing position, capturing orientation, color characteristics, zoom setting, exposure setting, shuttle setting, ISO setting, noisy characteristic, other imaging device characteristics, lighting condition, etc., according to one embodiment.

The peripheral area 130 may be a region and/or part of the storage center 110 around the autonomous supply chain node vehicle 118 along the trajectory 116. It may be the peripheral down area (e.g., floor), up area (e.g., ceiling), left area, right area, front area, back area of the autonomous supply chain node vehicle 118 along the trajectory 116.

The imaging device 132 may be placed in the autonomous supply chain node vehicle 118. It may be a down-view imaging device 400A placed to capture down-view images of the floor 300A, a side-view imaging device 400B to capture side-view images of the shelves and side walls 300B, or an up-view imaging device 400C to capture up-view images of the ceiling 300C. It may be a depth camera. The imaging device 132 may be a device used to capture the training set and operating set of discrete overlapping images 128 using at least one of visible light 200, polarized visible light, infra-red 202, ultra-violet 204, microwave 206, sound 208, ultra-sound 210, radar 212, laser 214, shock wave 216, mechanical vibration 218, and other electromagnetic radiation 220 in at least one band in a frequency spectrum. It may be a combination of one or more such imaging devices (e.g., a combination of a frontal infra-red camera, two down-view visible light camera, one down-view infra-red camera, one side-view ultra-violet camera for the left, one side-view ultra-violet camera for the right, and one up-view laser camera for the top), according to one embodiment.

The illuminating device 134 may be a piece of equipment for the deliberate use of light to achieve a practical and/or aesthetic effect in the autonomous supply chain node vehicle. The illuminating device 134 may be placed in the autonomous supply chain node vehicle 118 to provide illumination for the imaging device 132. It may provide uniform (non-patterned) illumination and/or patterned illumination. The illumination may be continuous and/or intermittent over time. The illumination strength may be time varying, spatial varying and direction varying. Different peripheral condition may trigger different illuminating condition (e.g., shelves nearby may need weaker illumination while shelves far away may need stronger illumination, or a crack on the floor may be best captured first in an image with illumination from the right and then in another image with illumination from the left.) The illuminating device 134 may include energy source(s) 224 to emit at least one of visible light 200, infra-red 202, ultra-violet 204, microwave 206, sound 208, ultra-sound 210, radar 212, laser 214, shock wave 216, mechanical vibration 218, and the other electromagnetic radiation 220 in at least one band in the frequency spectrum, according to one embodiment.

The virtual image-code tape 136 may be used to capture a continuous region of the storage center 110 (e.g. continuous area along the trajectory 600) with a set of globally unique identifiers (GUIDs) 138 associated with the peripheral area 130 along the trajectory 116. The GUIDs 138 may include identifiable image features 140 and associated spatial information 142. The identifiable image features 140 may be the structures (e.g., edges, dots, speckles, shades, color patterns, patches, textures, shapes, depth profile, protruding feature, sunken feature, etc.) associated with the artificial calibration marks 302A, 302B and 302C, the artificial trajectory road signs 304A, 304B, and 304C, the floor texture marks 306A, the side texture marks 306B, and the ceiling texture marks 306C in the set of discrete overlapping images 129 and a set of spatial information 142 in the storage center 110, according to one embodiment.

The spatial information 142 may be spatial and/or geographical data associated with each of the identifiable image features 140 in the storage center 110. It may include spatial coordinates of a feature, orientation of a feature, length, width, height, depth of a feature, associated illumination. Under different illumination (e.g. visible light 200, infra-red 202, ultra-violet 204, etc.), the same mark on the floor may generate different features with corresponding spatial information 142, according to one embodiment.

FIG. 1 illustrates the central inventory server 100 communicatively coupled with the layout diagram 108 of the storage center 110. The central inventory server 100 includes the central processor 102, the central memory 104 and the set of central instructions 106. The autonomous supply chain node vehicle 118 includes the imaging device 132, the illuminating device 134, the embedded processor 131, the embedded memory 133 and the embedded instructions 135 according to one embodiment.

The layout diagram 108 of the storage center 110 is analyzed using the central inventory server 100 with the central processor 102, the central memory 104 and the set of central instructions 106. The layout diagram 108 includes a set of shelves 112. The trajectory 116 is determined in the layout diagram 108 using the central inventory server 100 for the movement of the autonomous supply chain node vehicle 120 in the storage center 110 avoiding the set of shelves 112. Some portions of the trajectory 116 (e.g., the portion of trajectory 122) are each locally parallel to and within a distance constraint 126 with respect to an adjacent shelf 124.

The central inventory server 100 is communicatively connected with the autonomous supply chain node vehicle 118. The autonomous supply chain node vehicle 118 has an embedded processor 131, an embedded memory 133 and a set of embedded instructions 135. The training set of discrete overlapping images 128 of the peripheral area 130 along the trajectory 116 is captured with the imaging device 132 and/or the illuminating device 134 on the autonomous supply chain node vehicle 118 in the learning mode 1500 of the autonomous supply chain node vehicle 118.

In one embodiment, the training set of discrete overlapping images 128 is processed using the autonomous supply chain node vehicle 118 and the central inventory server 100 in the learning mode 1500 of the autonomous supply chain node vehicle 118 to generate the virtual image-code tape 136 capturing a continuous area along the trajectory 600 in the storage center 110. The set of globally unique identifiers (GUIDs) 138 is associated with the peripheral area 130 along the trajectory 116. The set of GUIDs 138 includes identifiable image features 140 associated with the training set of discrete overlapping images 128 and the set of spatial information 142 of the identifiable image features 140 in the storage center 110.

The operating set of discrete overlapping images 127 of the peripheral area 130 is captured around the autonomous supply chain node vehicle 118 with the imaging device 132 and/or the illuminating device 134 in a normal mode 1502 of the autonomous supply chain node vehicle 118. The operating set of discrete overlapping images 127 is processed using the autonomous supply chain node vehicle 118 and the central inventory server 100 in the normal mode 1502 of the autonomous supply chain node vehicle 118. Associated identifiable image features 140 are compared with the set of GUIDs 138 of the virtual image-code tape 136 to determine a current location of the autonomous supply chain node vehicle 118 with respect to the trajectory 116 in the normal mode 1502. The autonomous supply chain node vehicle 118 is directed to reposition and/or move 120 with respect to the trajectory 116 based on the current location 119 of the autonomous supply chain node vehicle 118 in the normal mode 1502 of the autonomous supply chain node vehicle 118, according to one embodiment.

Figure 2:
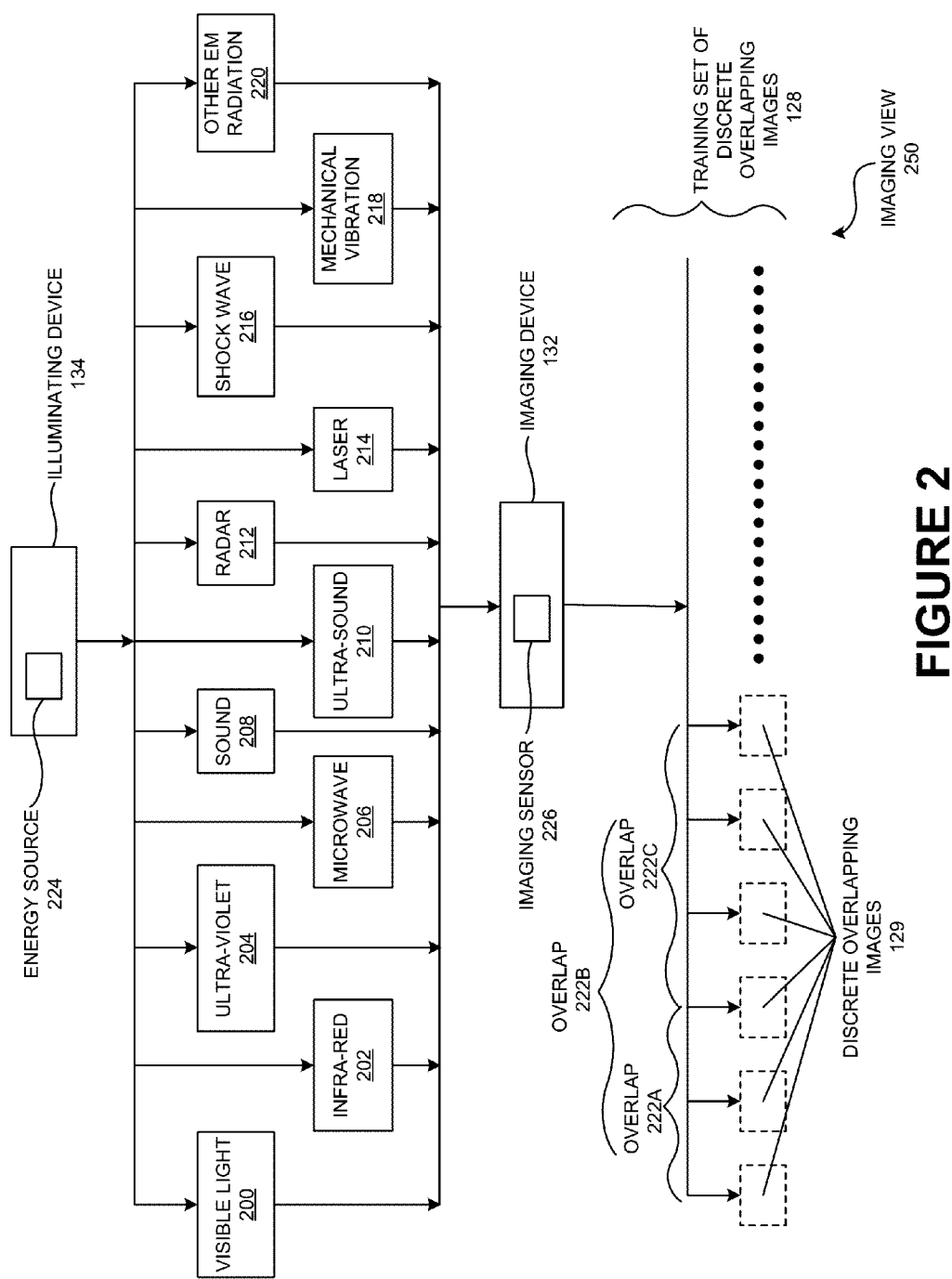
FIG. 2 is an imaging view of the capturing of a training set of discrete overlapping images using an imaging device and an illuminating device of FIG. 1, according to one embodiment.

FIG. 2 is an imaging view 250 of the capturing of a training set of discrete overlapping images 128 using an imaging device 132 and an illuminating device 134 of FIG. 1, according to one embodiment.

Particularly, FIG. 2 builds on FIG. 1 and further adds a visible light 200, an infra-red 202, an ultra-violet 204, a microwave 206, a sound 208, an ultra-sound 210, a radar 212, a laser 214, a shock wave 216, a mechanical vibration 218, other EM radiation 220, an overlap 222A-222C, an energy source 224 and an imaging sensor 226, according to one embodiment.

Visible light 200 may be a form of electromagnetic (EM) radiation that is visible to the human eye. It may include red, green, blue components giving rise to color perception of the human eye. Visible light 200 may be emitted as the energy source 224 of the illuminating device 134. Visible light 200 may also be used to capture the set of discrete overlapping images 129 by the imaging device 132. Infra-red 202 may be a form of electromagnetic (EM) radiation having a wavelength just greater than that of the red end of the visible light 200 but less than that of microwave(s) 206. Infra-red 202 may be emitted as the energy source 124 of the illuminating device 134. Infra-red 202 may also be used to capture the set of discrete overlapping images 129 by the imaging device 132, according to one embodiment.

Ultra-violet 204 may be a form of electromagnetic (EM) radiation having a wavelength shorter than that of the violet end of the visible spectrum but longer than that of X-rays. Ultra-violet 204 may be emitted as the energy source 124 of the illuminating device 134. Ultra-violet 204 may also be used to capture the set of discrete overlapping images 129 by the imaging device 132. Microwave 206 may be a form of electromagnetic (EM) radiation. Microwave 206 may be shorter than that of a normal radio wave but longer than those of infra-red 202. Microwave 206 may be used in radar 212. Microwave 206 may be emitted as the energy source 124 of the illuminating device 134. Microwave 206 may also be used to capture the set of discrete overlapping images 129 by the imaging device 132, according to one embodiment.

Sound 208 may be a vibration that propagates as a typically audible mechanical wave of pressure and displacement, through a medium such as air, water, or another medium, according to one embodiment. Ultra-sound 210 may be a method of viewing internal structures in which sound waves of high frequency are bounced off internal parts from outside structure. Ultra-sound 210 may be emitted as the energy source 224 of the illuminating device 134. Ultra-sound 210 may also be used to capture the set of discrete overlapping images 129 by the imaging device 132, according to one embodiment.

Radar 212 may be a system for the autonomous supply chain node vehicle 118 to detect the presence, direction, distance, and relative speed of the shelves, furniture, fixtures and obstacles, in the storage center 110, by sending out pulses of radio waves which are reflected off from the objects back to the autonomous supply chain node vehicle 118. Radar 212 may be emitted as the energy source 224 of the illuminating device 134. Radar 212 may also be used to capture the set of discrete overlapping images 129 by the imaging device 132, according to one embodiment.

Laser 214 may be a device that generates an intense beam of coherent monochromatic light (or other electromagnetic radiation 220) by stimulated emission of photons. Laser 214 may be used to capture the set of discrete overlapping images 129. Shock wave 216 may be a region of abrupt change of pressure and density moving as a wave front at and/or above the velocity of sound, caused by an intense supersonic flow over the autonomous supply chain node vehicle 118 of the storage center 110 to capture the set of discrete overlapping images 129, according to one embodiment.

Mechanical vibration 218 may be the measurement of a periodic process of oscillations with respect to an equilibrium point. Other EM radiation 220 may be another kind of radiation including visible light 200, infra-red 202, ultra-violet 204, microwave 206, sound 208, ultra sound 210, radar 212, laser 214, shock wave 216, and mechanical vibration 218 in which electric and magnetic fields vary simultaneously, according to one embodiment.

The discrete overlapping images 129 may exhibit overlap such as 222A, 222B and 222C when the same identifiable image feature 140 of the same object is captured in the consecutive images. As an example, one identifiable image feature 140 of an object appears in three consecutive images in overlap 222A. Another identifiable image feature 140 of another object appears in four consecutive images in overlap 222B. Yet another identifiable image feature of yet another object appears in four consecutive images in overlap 222C, according to one embodiment.

The energy source 224 may be sources from which energy can be available to provide heat, light, and power. The energy source 224 may be used to emit visible light 200, infra-red 202, ultra-violet 204, microwave 206, sound 208, ultra-sound 210, radar 212, laser 214, shock wave 216, mechanical vibration 218, and/or the other electromagnetic radiation 220 in at least one band in the frequency spectrum. The imaging sensor 226 may be used to capture the set of discrete overlapping images 128 using visible light 200, infra-red 202, ultra-violet 204, microwave 206, sound 208, ultra-sound 210, radar 212, laser 214, shock wave 216, mechanical vibration 218, and/or other electromagnetic radiation 220 in at least one band in a frequency spectrum, according to one embodiment.

FIG. 2 illustrates that the illuminating device 134 may include the energy source 224 and the imaging device 132 may include the imaging sensor 226 of the autonomous supply chain node vehicle 118 of FIG. 1. The discrete overlapping images 129 may include the overlap 222A-222C in the training set of discrete overlapping images 128 and/or the operating set of discrete overlapping images 127, according to one embodiment.

The imaging device 132 may include imaging sensor(s) 226 to capture the set of discrete overlapping images 129 using visible light 200, infra-red 202, ultra-violet 204, microwave 206, sound 208, ultra-sound 210, radar 212, laser 214, shock wave 216, mechanical vibration 218, and/or other electromagnetic radiation 220 in a band in a frequency spectrum. The imaging device 132 may include imaging sensor(s) 226 to capture electric field, magnetic field, electromagnetic field, chemical composition, atmospheric variation (e.g. humidity, pressure, air movement, wind speed, wind sheer, sea/water wave, and/or other navigational informatics), altitude of the sun and/or other celestial bodies, angle between the horizon and the sun and/or a celestial body, and/or gravitational field. The imaging device 132 may capture the terrain, height, depth of the surrounding.

The illuminating device 134 may include energy source(s) 224 to emit visible light 200, infra-red 202, ultra-violet 204, microwave 206, sound 208, ultra-sound 210, radar 212, laser 214, shock wave 216, mechanical vibration 218, and/or the other electromagnetic radiation 220 in the band in the frequency spectrum, according to one embodiment.

Figure 3:
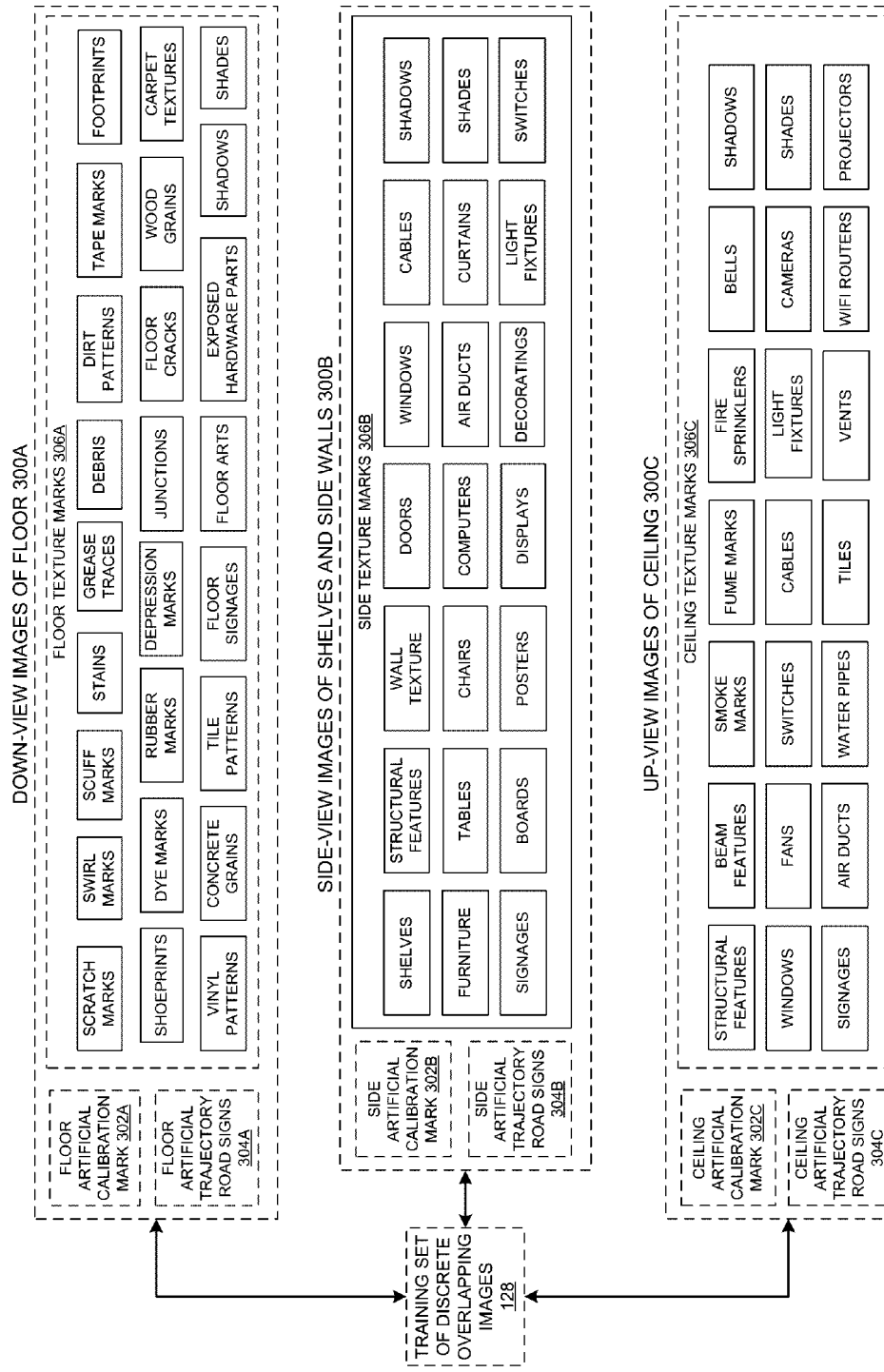
FIG. 3 is an imaging view of down-view images of the floor, side-view images of the shelves and the side walls, and up-view images of the ceiling captured by the imaging device of FIG. 1, according to one embodiment.

FIG. 3 is an imaging view 350 of down-view images of the floor 300A, side-view images of the shelves and the side walls 300B, and up-view images of the ceiling 300C captured by the imaging device 132 of FIG. 1, according to one embodiment.

Particularly, FIG. 3 builds on FIG. 1 and further adds down-view images of floor 300A, a side-view images of shelves and side walls 300B, up-view images of ceiling 300C, artificial calibration marks 302A-302C, artificial trajectory road signs 304A-304C, floor texture marks 306A, side texture marks 306B, and ceiling texture marks 306C, according to one embodiment.

The down-view images of floor 300A may be captured by down-view imaging device(s) 400A. The down-view images of the floor 300A may contain a set of floor artificial calibration marks 302A, a set of floor artificial trajectory road signs 304A, and/or a set of floor texture marks 306A including scratch marks, swirl marks, scuff marks, stains, grease traces, debris, dirt patterns, tape marks, footprints, shoeprints, dye marks, rubber marks, depression marks, junctions, floor cracks, wood grains, carpet textures, vinyl patterns, concrete grains, tile patterns, floor signages, floor arts, exposed hardware parts, shadows, shades and/or other marks.

The side-view images of the shelves and side walls 300B may be captured by side-view imaging device 400B. The side-view images of the shelves and side walls 300B may contain a set of side artificial calibration marks 302B, a set of side artificial trajectory road signs 304B, and/or a set of side texture marks 306B including shelves, structural features, wall texture, doors, windows, cables, furniture, tables, chairs, computers, air ducts, curtains, signages, boards, posters, displays, decorations, light fixtures, switches, shadows, shades and/or other marks, according to one embodiment.

The up-view images of the ceiling 300C may be captured by up-view imaging device 400C. The up-view images of the ceiling 300C may contain a set of ceiling artificial calibration marks 302C, a set of ceiling artificial trajectory road signs 304C, and/or a set of ceiling texture marks 306C including structural features, beam features, smoke marks, fume marks, fire sprinklers, bells, windows, fans, switches, cables, light fixtures, cameras, signages, air ducts, water pipes, tiles, vents, WiFi routers, projectors, shadows, shades, and/or other marks.

The artificial calibration marks 302A-302C may be calibration marks artificially introduced in the storage center 110 for the calibration of the mounting and/or settings of the imaging device 132 on the autonomous supply chain node vehicle 118, the mounting and/or settings of the illuminating device 134, the acquisition of the discrete overlapping images 129 using the imaging device 132 and/or the illuminating device 134, and/or the calibration of the preprocessing 500 and/or the processing 502 of the discrete overlapping images 129, and/or the calibration of the computation of the current location 119 based on the discrete overlapping images. The calibration may be with respect to the layout diagram of the storage center 110, according to one embodiment.

The artificial trajectory road signs 304A-304C may be marks for navigation, transporting, maintenance, parking, and/or other location-specific purpose. The artificial trajectory road signs 304A-304C may function as recognizable markers of significant locations (e.g., a particular shelf, a particular aisle, a particular junction point, a particular loading bay, a particular charging station, a particular unloading bay, a particular standby bay, etc.) along or next to the trajectory 116. When the artificial trajectory road signs 304A-304C appear in the discrete overlapping images, some associated functions and/or tasks may be performed. The artificial trajectory road signs 304A-304C may signal navigation hints to the autonomous supply chain node vehicle 118 (e.g. turn left, turn right, U-turn, angle-turn, parking bay on the right, charging station on the left, slow, fast, narrow aisle, wide aisle, high traffic region, caution, yield, etc.), according to one embodiment.

The floor texture marks 306A may be any marks in the down direction. It may be marks on the floor (e.g. stains, cracks, holes, uneven ground, soil, vegetation, swirl marks, scratch marks, scuff marks, tape marks, wood grain, carpet texture, junction, rubber marks, dye marks, shoeprints, footprints, grease, tile patterns, floor signage, floor arts, lighting patterns, etc.), marks of objects on the floor (e.g. pets, shoes, mat, nails, tools, screws, papers, grocery items, snacks, food, debris, exposed hardware parts, garbage, etc.), marks of fluid on the floor, etc.

The side texture marks 306B may be any mark on the left side, right, front and/or back sides. The side texture marks 206B may contain shelves, structural features, wall texture, doors, windows, cables, furniture, fixtures, tables, chairs, computers, air ducts, curtains, posters, paintings, arts, plants, maps, notices, signages, boards, posters, displays, decorations, light fixtures, switches, shadows, shades and/or other marks. The ceiling texture mark 306C may be structural features, beam features, smoke marks, fume marks, fire sprinklers, shelves, bells, windows, fans, switches, cables, light fixtures, cameras, signages, air ducts, water pipes, tiles, vents, WiFi routers, projectors, over-hanging items, protruding items, shadows, shades and/or other marks, according to one embodiment.

FIG. 3 illustrates the set of discrete overlapping images 128 to capture the down-view images of floor 300A, the side-view images of shelves and side walls 300B, and the up-view images of ceiling 300C.

The imaging device 132 may capture down-view images of floor 300A with the set of floor artificial calibration marks 302A, the set of floor artificial trajectory road signs 304A, and/or the set of floor texture marks 306A. It may include scratch marks, swirl marks, scuff marks, stains, grease traces, debris, dirt patterns, tape marks, footprints, shoeprints, dye marks, rubber marks, depression marks, junctions, floor cracks, wood grains, carpet textures, vinyl patterns, concrete grains, tile patterns, floor signages, floor arts, exposed hardware parts, shadows, and/or shades, according to one embodiment.

The imaging device 132 may also capture side-view images of the shelves and side walls 300B with the set of side artificial calibration marks 302B, the set of side artificial trajectory road signs 304B, and/or the set of side texture marks 306B. It may include shelves, structural features, wall texture, doors, windows, cables, furniture, tables, chairs, computers, air ducts, curtains, signages, boards, posters, displays, decorations, light fixtures, switches, shadows and/or shades.

The imaging device 132 may further capture up-view images of the ceiling 300C with the set of ceiling artificial calibration marks 302C, the set of ceiling artificial trajectory road signs 304C, and/or a set of ceiling texture marks 306C. It may include structural features, beam features, smoke marks, fume marks, fire sprinklers, bells, windows, fans, switches, cables, light fixtures, cameras, signages, air ducts, water pipes, tiles, vents, WiFi routers, projectors, shadows and/or shades, according to one embodiment.

Figure 4:
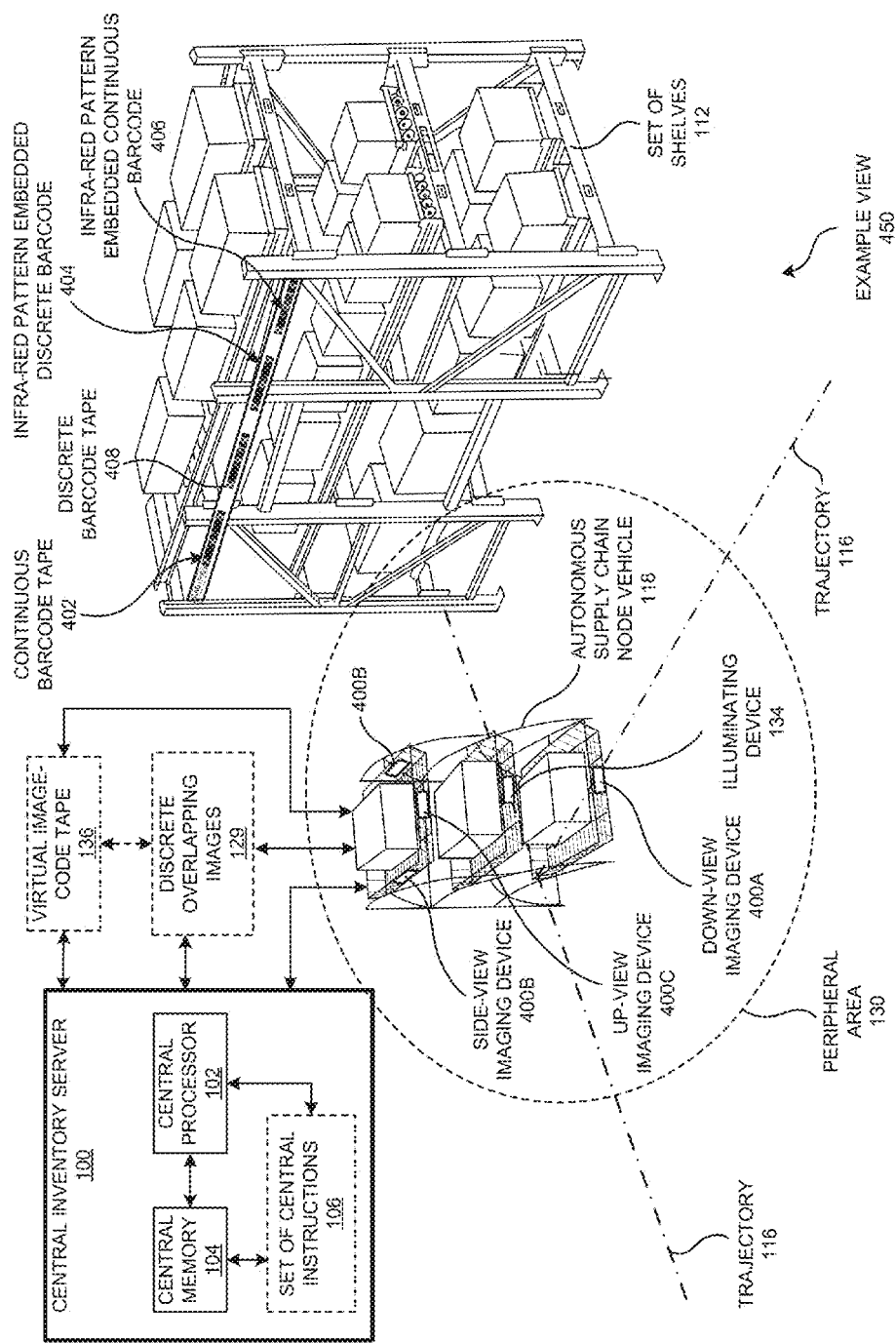
FIG. 4 is an example view of the autonomous supply chain node vehicle avoiding the set of shelves while following the trajectory with imaging devices to capture down-view images, side-view images and/or up-view images of the peripheral area of the trajectory, according to one embodiment.

FIG. 4 is an example view 450 of the autonomous supply chain node vehicle 118 avoiding the set of shelves 112 while following the trajectory 116 with down-view imaging device (s) 400A-400C to capture down-view images of the floor 300A, side-view images of the shelves and side walls 300B and/or up-view images of the ceiling 300C of the peripheral area 130 of the trajectory 116, according to one embodiment.

Particularly, FIG. 4 builds on FIG. 1 and further adds a down-view imaging device 400A, a side-view imaging device 400B, an up-view imaging device 400C, a continuous barcode tape 402, an infra-red pattern embedded discrete barcode 404, an infra-red pattern embedded continuous barcode 406 and a discrete barcode tape 408, according to one embodiment.

The down-view imaging device 400A may be an imaging device 132 of the autonomous supply chain node vehicle 118 aimed downward to capture down-view images. The side-view imaging device 400B may be an imaging device 132 aimed side-way to capture the side-view images of the shelves and side walls 300B of the autonomous supply chain node vehicle 118. The up-view imaging device 400C may be an imaging device 132 aimed upward to capture the up-view images of the ceiling 300C.

The continuous barcode tape 402 may be a bar code tape which may be scanned with a bar-code scanner or captured by a smart device (e.g., a mobile device 1102, or the autonomous supply chain node vehicle 118 with the imaging device 132). The continuous barcode tape 402 may include information of the location of points along the continuous barcode tape 402. The continuous barcode tape 402 may also be a series of the discrete barcode tape 408 placed adjacent to each other, according to one embodiment.

The discrete barcode tape 408 may be the bar code tape including a series of discrete bar code(s) 408 placed adjacent to each other. Each item in each of the series of discrete bar code(s) 408 may be a distance of that barcode from a left edge of the bar code tape in centimeters. Every barcode of the series of discrete bar code(s) 408 may have a preamble to make it recognizable to the central inventory server 100.

The infra-red pattern embedded discrete barcode 404 may be discrete barcode tape 408 embedded with patterns visible and/or reflective to infra-red 202. The infra-red pattern embedded continuous barcode 406 may be continuous barcode tape 402 embedded with patterns visible and/or reflective to infra-red 202. The patterns may be lines, dots, shapes, text, logo, symbols, etc., according to one embodiment.

The continuous barcode tape 402, the infra-red pattern embedded discrete barcode 404, the infra-red pattern embedded continuous barcode 406, the discrete barcode tape 408 may include a combination of 1-dimensional bar-code, 2-dimensional bar-code, higher-dimensional bar-codes, text, graphics, images, and/or other patterns, according to one embodiment.

FIG. 4 illustrates the central inventory server 100 communicatively coupled with the illuminating device 134, the down-view imaging device 400A, the side-view imaging device 400B and the up-view imaging device 400C of the autonomous supply chain node vehicle 118. The central inventory server 100 is further coupled with the virtual image-code tape 136 associated with the discrete overlapping images 129 of the autonomous supply chain node vehicle 118, according to one embodiment.

The autonomous supply chain node vehicle may move along the trajectory 116 avoiding the set of shelves 112. The set of shelves may contain the continuous barcode tape 402, the discrete barcode tape 408, the infra-red pattern embedded discrete barcode 404 and the infra-red pattern embedded continuous barcode 406, according to one embodiment.

Figure 5:
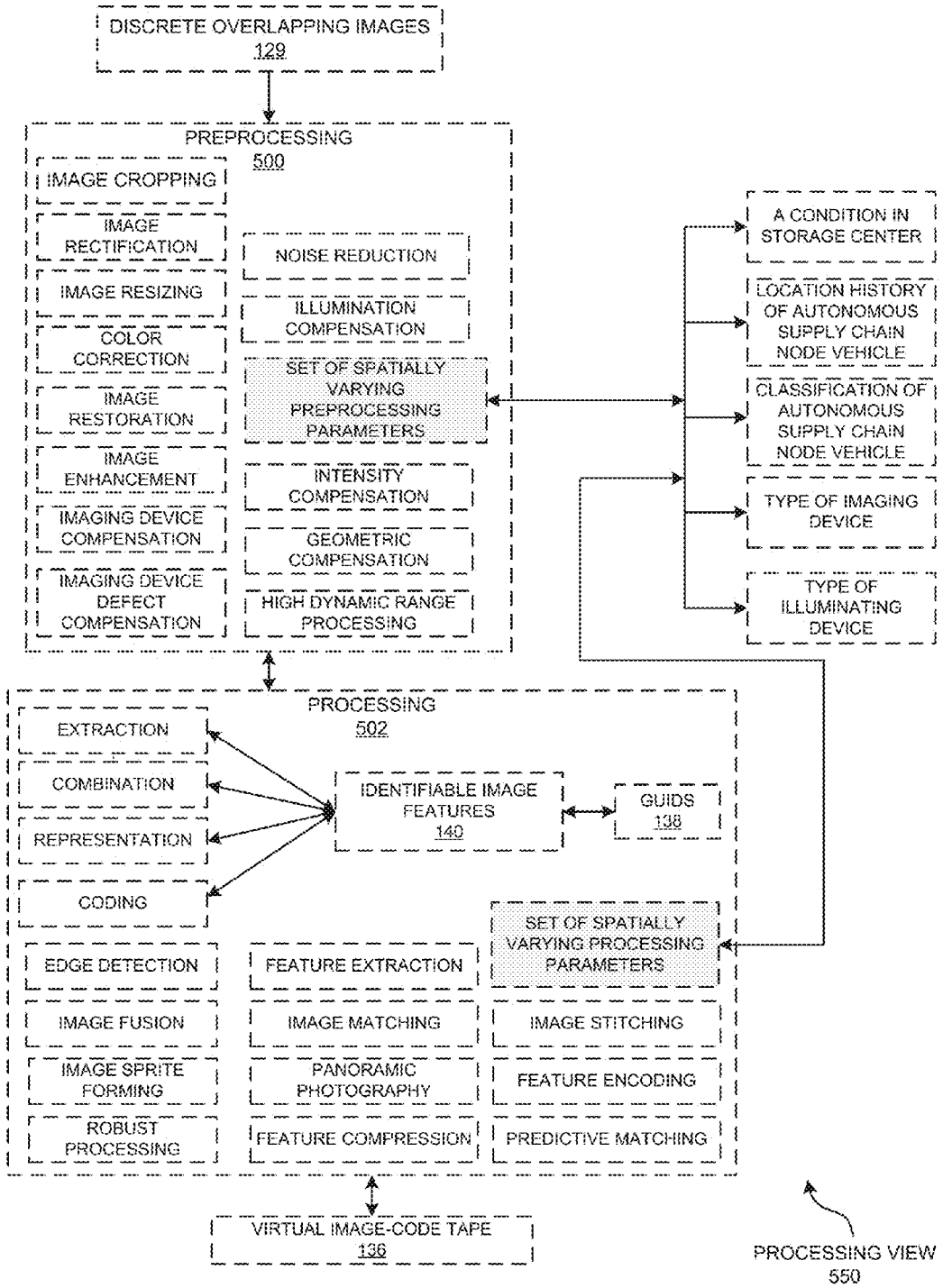
FIG. 5 is a processing view of the preprocessing and processing of the discrete overlapping images to generate the virtual image-code tape of FIG. 1, according to one embodiment.

FIG. 5 is a processing view 550 of the preprocessing 500 and processing 502 of the discrete overlapping images 129 to generate a virtual image-code tape 136 of FIG. 1, according to one embodiment.

Particularly, FIG. 5 builds on FIG. 1 and further adds a preprocessing 500, and a processing 502, according to one embodiment.

The preprocessing 500 may prepare the discrete overlapping images 129 for the processing 502 in any mode of the autonomous supply chain node vehicle 118. During the image acquisition and capturing using the imaging device 132, many artifacts and/or problems (e.g., wrong color, too bright, too dark due to changing ambient lighting and condition in the storage center 110, unsteady camera due to vibration/collision/earthquake, noisy imaging sensor (e.g., imaging sensor 226), distortion due to optical lens especially fish-eye lens and/or wide-angle lens, motion-blur, perspective change due to motion, undesirable shadow/refraction/reflection due to the autonomous supply chain node vehicle 118 itself) may occur and the preprocessing 500 may be applied to equalize and compensate for them. In the event that the discrete overlapping images may be captured by more than one imaging device (e.g., multiple down-view imaging devices, imaging devices on another autonomous supply chain node vehicle 1100, imaging device on a mobile phone and/or mobile device 1102), the difference among the images from different imaging devices may be compensated and/or equalized by the preprocessing 500. The preprocessing 500 may allow the processing 502 to be applied with the assumption that the discrete overlapping images 129 may contain no artifacts and/or problems. The preprocessing parameters used in the preprocessing 500 may be spatially varying as the discrete overlapping images 129 captured at different locations may have different distortions and problems. For the same location, the preprocessing parameter may be time varying as the lighting condition may change with time of the day (e.g., morning sun, mid-day sun, afternoon sun, evening sun, moonlight at night), day of the week (e.g., weekdays, weekends, holidays), season of the year (e.g. winter with less daylight, summer with longer daylight), weather condition (e.g., sunny, cloudy, stormy, lighting, etc.), and/or human activities (e.g. few lights on before work, some lights on during morning and afternoon, most lights on at night, power outage, etc.).

The processing 502 may be applied to extract, combine, represent, compare, and encode identifiable image features 140 from the discrete overlapping images 129. Identifiable image features 140 may be extracted from each image. Corresponding identifiable image features 140 appearing in several discrete overlapping images (e.g., discrete overlapping images 129) may be combined to give consistent identifiable image features 140. Corresponding spatial information 142 in the several discrete overlapping images (e.g., discrete overlapping images 129) may be combined to give consistent spatial information 142. In the learning mode 1500, these consistent identifiable image features 140 and consistent spatial information 142 may become the GUIDs 138.

Representation of the identifiable image features 140 and the spatial information 142 may be generated. For the case of GUIDs 138, encoding of the representation of the identifiable image features 140 and the spatial information 142 may be performed for storage and for future reference and/or comparison. In normal mode, the consistent identifiable image features 140 may be compared with the GUIDs 138 in search of a match. When a match may be found, the corresponding spatial information may be used to determine the current location 119 of the autonomous supply chain node vehicle 118, according to one embodiment.

Spatial information 142 may be entered by the user 101 in the learning mode 1500. Spatial calibration of the current location 119 may be performed when signaled by the user 101. Spatial calibration of the current location 119 may be performed when the artificial calibration mark (e.g., 302A, 302B, 302C) is captured in the discrete overlapping images 129. Predefined spatial information 142 may be defined and/or associated with each artificial calibration mark (e.g., 302A, 302B, 302C). Special learning marks may be used in the learning mode 1500 to allow frequent calibration of the current location 119. The special learning marks may be removed. In the normal mode 1502, cautious mode 1504 and lost mode 1506, the spatial information of a feature in an image may be computed based on other features in the image. The spatial information of a feature in an image may be based on features in the adjacent images and/or the speed and direction of movement of the autonomous supply chain node vehicle 120.

The processing parameters used in the processing 502 may be spatially varying as the terrain of the floor may be different at different locations in down-view images of the floor 300A. The depth of objects (e.g., the set of shelves 112) in side-view images of the shelves and side walls 300B and/or the height of the objects in up-view images of the ceiling 300C may be different at different locations. Different identifiable image features 140 may need different processing parameters, according to one embodiment.

FIG. 5 illustrates preprocessing 500 the discrete overlapping images 129 in any mode of the autonomous supply chain node vehicle 118 before the processing 502. The preprocessing 500 may perform noise reduction, image cropping, image rectification, image resizing, color correction, image restoration, image enhancement, imaging device compensation, imaging device defect compensation, illumination compensation, intensity compensation, high dynamic range processing, and/or geometric compensation using a set of spatially varying preprocessing parameters. The method may process any set of discrete overlapping images 129 in any mode of the autonomous supply chain node vehicle 118.

Extraction, combination, representation, coding and/or comparing of associated identifiable image features 140 may be performed. Feature extraction, edge detection, image matching, predictive matching, image fusion, image stitching, image sprite forming, panoramic photography, feature encoding, feature compression, and robust processing may be used. A set of spatially varying processing parameters may be used, according to one embodiment.

The set of spatially varying preprocessing parameters and the set of spatially varying processing parameters may be spatially varying according to a location history and/or a processing history of the autonomous supply chain node vehicle 118, a classification of the autonomous supply chain node vehicle 118, a state of the autonomous supply chain node vehicle 118, a type of the imaging device 132, a state of the imaging device 132, a type of the illuminating device 134, a state of the illuminating device 134, and/or a condition of the storage center 110, according to one embodiment.

Figure 6:
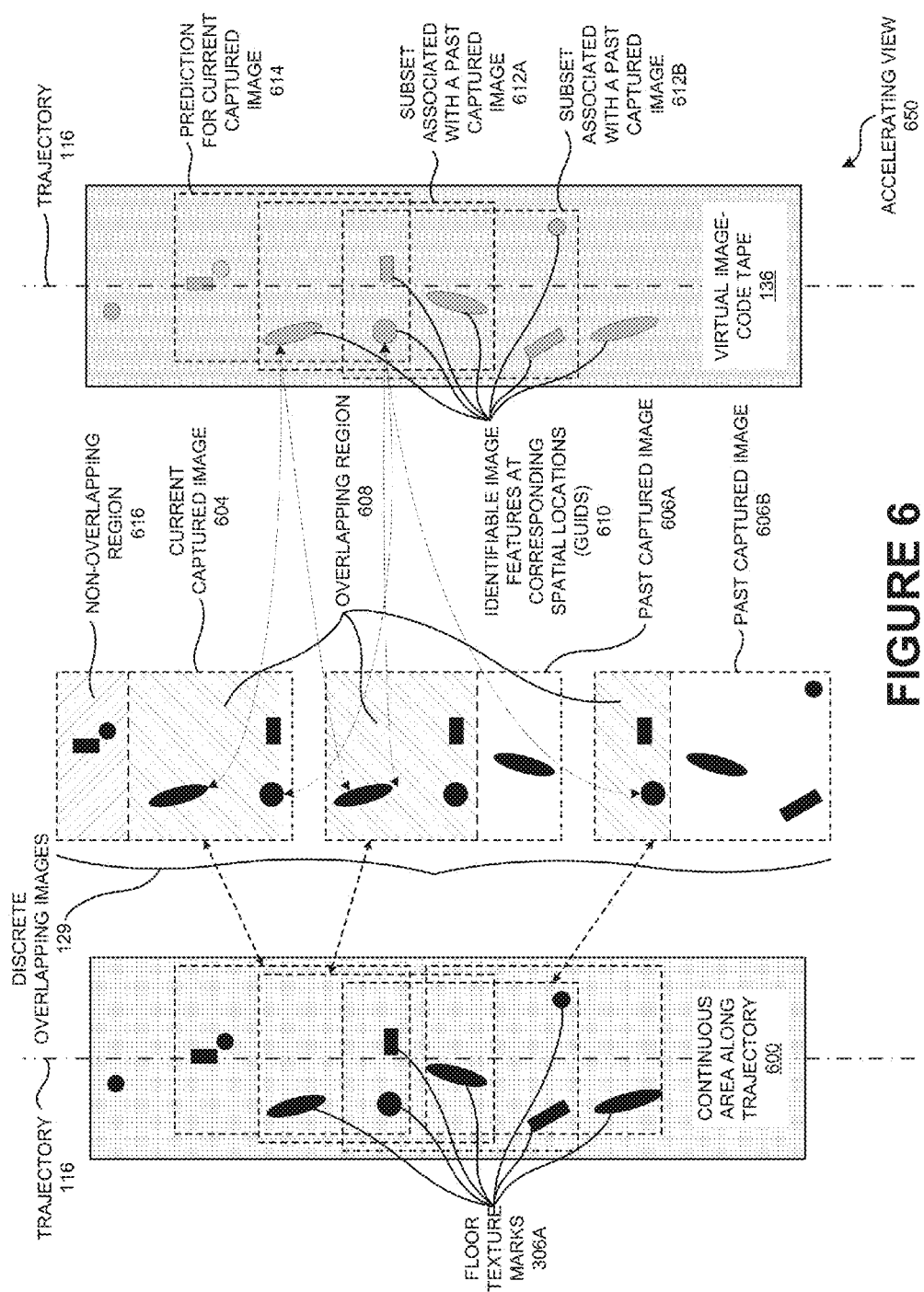
FIG. 6 is an accelerating view illustrating the processing of a current captured image accelerated by using overlapping past captured images and GUIDs of the virtual image-code tape of FIG. 1, according to one embodiment.

FIG. 6 is an accelerating view 650 illustrating the processing 502 of a current captured image 604 accelerated by using overlapping past captured images 606A-606B and GUIDs 138 of the virtual image-code tape 136 of FIG. 1, according to one embodiment.

Particularly, FIG. 6 builds on FIG. 1 and further adds a continuous area along trajectory 600, floor marks 602, a current captured image 604, past captured images 606A-606B, an overlapping region 608, an identifiable image features at corresponding spatial locations (GUIDs) 610, subset associated with a past captured image 612A-612B, a prediction for current captured image 614 and a non-overlapping region 616, according to one embodiment.

The continuous area along the trajectory 600 may be a continuous stretch of area along the trajectory 116. For the case of down-view images of the floor 300A, there may be some floor texture marks 306A giving rise to identifiable image features 140. It may be these floor texture marks 306A that may provide the whereabouts of the autonomous supply chain node vehicle 118.

Among the discrete overlapping images 129, a current captured image 604 may overlap with several past captured image 601A-606B. As such, the current captured image 604 may be partitioned into an overlapping region 608 which appears in one or more past captured images 606A-606B, and a non-overlapping region 616. In the example in FIG. 6, the overlapping region 608 appears in whole in 606A. Part of the overlapping region 608 appears in 606B. The overlapping region 608 may be a part and/or a portion of the current captured image 604 that overlaps with any of the set of past captured images 606A-606B, according to one embodiment.

The identifiable image features 140 of the current captured image 604 and the past captured images 606A-606B may be compared with the GUIDs 138 of the virtual image-code tape 136. When the identifiable image features 140 at corresponding spatial locations (GUIDs) 610 may match those of the current captured image 604 and the past captured images 606A-606B, the current location 119 may be inferred from the associated spatial information 142 of the GUIDs 138.

In the example in FIG. 6, the past captured image 606B may match the subset associated with a past captured image 612B. The past captured image 606A may match the subset associated with a past captured image 612A. Based on the overlapping region 608 of the current captured image 604 that may overlap with the past captured images 606A-606B, the identifiable image features 140 of the overlapping region 608 of the current captured image 604 may be associated with the corresponding identifiable image features at corresponding spatial locations (GUIDs) 610 in the subset associated with a past captured image(s) 612A-612B, according to one embodiment.

Thus, a prediction (e.g., prediction for current captured image 614) for the identifiable image features 140 of the current captured image 604 may be established by examining the GUIDs 138 in the corresponding region in the virtual image-code tape 136. In particular, a prediction for the identifiable image features 140 of the non-overlapping region 616 of the current captured image 604 may be established. With considerable confidence in the prediction for current captured image 614 in the non-overlapping region 616, simplified processing (e.g. simplified searching for matching GUIDs in the virtual image-code tape 136, simplified feature extraction, simplified feature combination, simplified feature comparison, etc.) may be performed for the non-overlapping region. With even higher confidence in the prediction for the current captured image 614 in the overlapping region 608, ultra-simplified processing (e.g. ultra-simplified search for matching GUIDs 138 in the virtual image-code tape 136, ultra-simplified feature extraction, ultra-simplified feature combination, ultra-simplied feature comparison, etc.) may be performed for the overlapping region 608. Ultra-simplified processing is simpler than simplified processing.

The non-overlapping region 616 may be a part and/or a portion of the current captured image 604 that does not overlap with any of the set of past captured images 606A-606B or is separated/different from the set of past captured images 606A-606B, according to one embodiment.

FIG. 6 illustrates accelerating the processing of a current captured image 604 in any mode of the autonomous supply chain node vehicle 118. The current captured image 604 may be compared with a set of past captured images 606A-606B that overlap with the current captured image 604. An overlapping region 608 of the current captured image 604 that overlaps with any of the set of past captured images 606A-606B and/or a corresponding non-overlapping region 616 of the current captured image 604 may be identified. A subset of the set of GUIDs (e.g., the subset associated with a past captured image 612A and the subset associated with a past captures image 612B) of the virtual image-code tape 136 is associated with the identifiable image features 140 of the set of past captured images 606A-606B, according to one embodiment.

A prediction (e.g., prediction for current captured image 614) of identifiable image features 140 of the current captured image 604 may be generated based on the identifiable image features 140 of the set of past captured images 606A-606B, the set of GUIDs 138 (e.g., the identifiable image features at corresponding spatial locations (GUIDs) 610) of the virtual image-code tape 136 and/or a location history of the autonomous supply chain node vehicle 118. Simplified processing may be performed on a non-overlapping region 616 and/or ultra-simplified processing on the overlapping region 608 based on the prediction (e.g., prediction for current captured image 614) of identifiable image features 140 of the current captured image 604, according to one embodiment.

Figure 7:
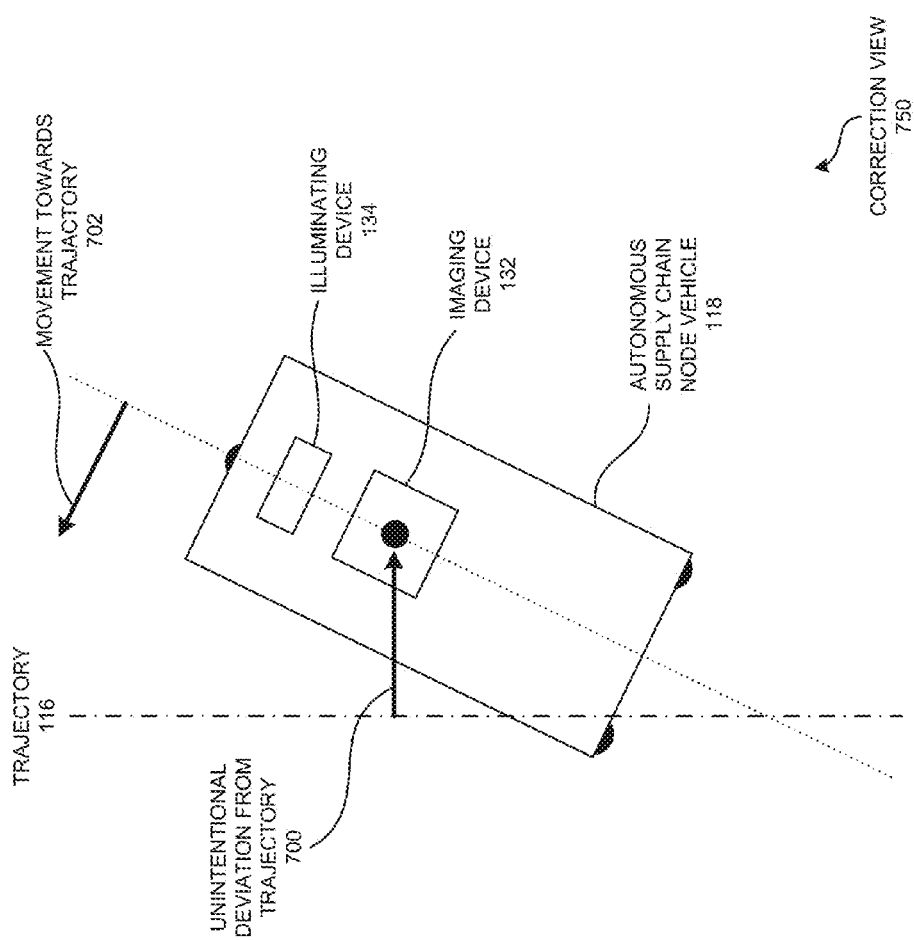
FIG. 7 is a correction view of the autonomous supply chain node vehicle of FIG. 1 moving towards the trajectory when an unintentional deviation from the trajectory is detected, according to one embodiment.

FIG. 7 is a correction view 750 of the autonomous supply chain node vehicle 118 of FIG. 1 moving towards the trajectory 116 when an unintentional deviation from the trajectory 700 is detected, according to one embodiment.

Particularly, FIG. 7 builds on FIG. 1 and further adds an unintentional deviation from trajectory 700, and a movement towards trajectory 702, according to one embodiment.

The unintentional deviation from trajectory 700 may be a result of imprecise turns, uneven floor, uneven tire pressure, uneven wheels, unbalanced wheel, uneven weight distribution, drifting, collision, and pushes by other vehicles and/or people. The movement towards trajectory 702 may be a corrective movement. It may be a sideways movement (moving to the left or to the right), according to one embodiment.

FIG. 7 illustrates directing the autonomous supply chain node vehicle 118 to detect any deviation of the autonomous supply chain node vehicle 118 from the trajectory 116 according to the comparing of associated identifiable image features 140 of the operating set of discrete overlapping images 127 with the set of GUIDs 138 of a virtual image-code tape 136. The autonomous supply chain node vehicle 118 may move towards the trajectory 116 when an unintentional deviation from the trajectory 700 is detected, according to one embodiment.

Figure 8:
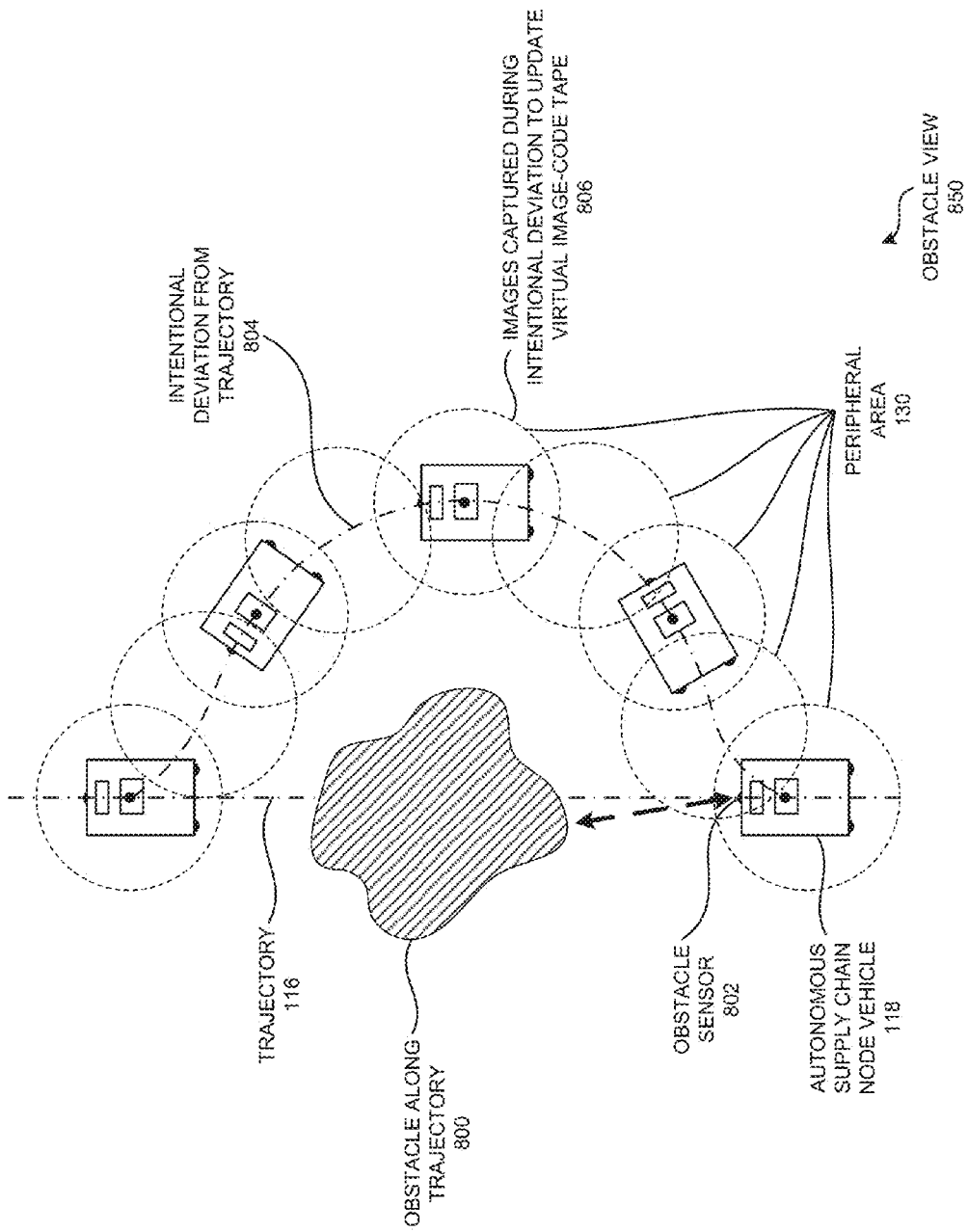
FIG. 8 is an obstacle view of the autonomous supply chain node vehicle with an intentional deviation from the trajectory to avoid an obstacle along the trajectory of FIG. 1, according to one embodiment.

FIG. 8 is an obstacle view 850 of the autonomous supply chain node vehicle 118 of FIG. 1 with an intentional deviation from the trajectory 804 to avoid an obstacle along the trajectory 800, according to one embodiment.

Particularly, FIG. 8 builds on FIG. 1 and further adds an obstacle along trajectory 800, an obstacle sensor 802, an intentional deviation from trajectory 804, and images captured during intentional deviation to update virtual image-code tape 806, according to one embodiment.

The obstacle along trajectory 800 may be a person, furniture, fixture, another vehicle, etc. It may be on or slightly off the trajectory 116 in front of the autonomous supply chain node vehicle 118 such that collision may occur if the autonomous supply chain node vehicle 118 continues to follow the trajectory 116. It may be an object on the floor. It may be an overhanging object at a height that would collide with the autonomous supply chain node vehicle 118. If the obstacle along trajectory 800 is close to being hit by autonomous supply chain node vehicle 118, the autonomous supply chain node vehicle 118 may choose to avoid the obstacle, according to one embodiment.

The obstacle sensor 802 may be an infrared based sensor which can be used for obstacle sensing, color detection (between basic contrasting colors line sensing), encoder sensor, IR remote signal sensing, etc. and also for wireless infrared communication. The obstacle sensor 802 may be based on sound, ultrasound, light, infra-red, ultra-violet, laser, some electromagnetic wave and/or electromagnetic field. The obstacle sensor 802 may be inductive sensors, capacitive sensors, magnetic sensors, photoelectric sensors and/or other sensors. The obstacle sensor 802 may be a combination of many sensors. The obstacle sensor 802 may provide high immunity from ambient light and can be used in all light conditions quite effectively, according to one embodiment.

The intentional deviation from trajectory 804 may be an alternative path that may maintain a certain minimum distance from the obstacle along trajectory 800. The images captured during intentional deviation to update virtual image-code tape 806 may be used to augment, expand and/or update the virtual image-code tape 136.

Any obstacle may be detected using an obstacle sensor 802. The autonomous supply chain node vehicle 118 may deviate intentionally from the trajectory 116 temporarily to avoid obstacles along the trajectory 800 when such obstacles are detected by the obstacle sensor 802. The virtual image-code tape 136 may be updated (e.g., images captured during intentional deviation to update virtual image-code tape 806) with a subset of the operating set of discrete overlapping images 127 captured during any deviation from the trajectory 116, according to one embodiment.

Figure 9:
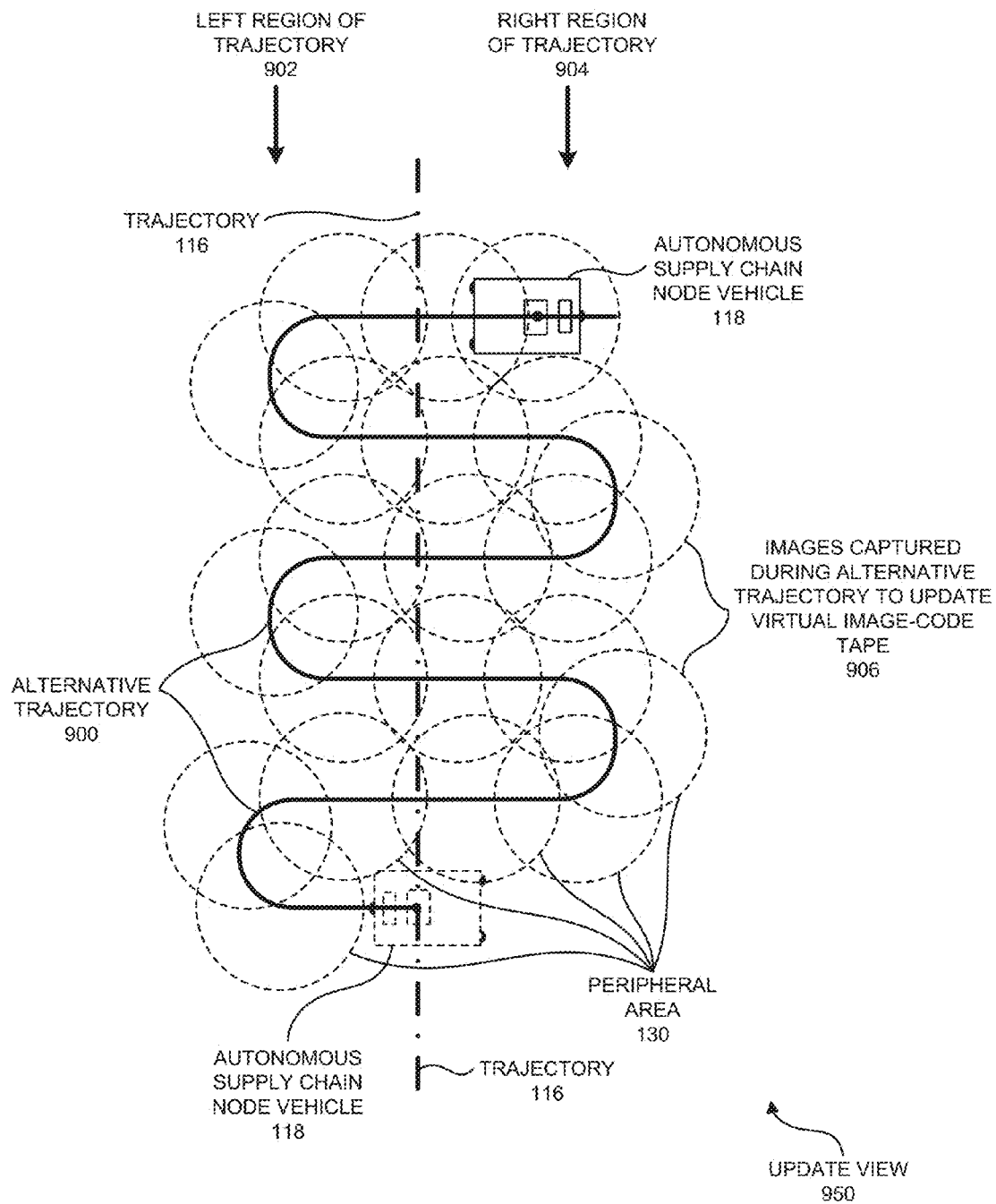
FIG. 9 is an update view of the autonomous supply chain node vehicle moving in an alternative trajectory with a sweeping zigzag coverage of an area comprising a left region and a right region of the trajectory to update the virtual image-code tape of FIG. 1, according to one embodiment.

FIG. 9 is an update view 950 of the autonomous supply chain node vehicle 118 moving in an alternative trajectory 900 with a sweeping zigzag coverage of an area comprising a left region of trajectory 902 and a right region of the trajectory 904 to update the virtual image-code tape 136 of FIG. 1, according to one embodiment.

Particularly, FIG. 9 builds on FIG. 1 and further adds an alternative trajectory 900, a left region of trajectory 902, a right region of the trajectory 904 and images captured during alternative trajectory to update virtual image-code tape 906, according to one embodiment.

The alternative trajectory 900 may oscillate and/or encircle along the trajectory 116 so as to cover an area of the peripheral area 130 around the trajectory 116. This may allow discrete overlapping images 129 to be captured in an area wider than the footprint of autonomous supply chain node vehicle 118. The area may include a left region of trajectory 902 and a right region of trajectory 904. The images captured during the alternative trajectory 900 may be used to expand and update the virtual image-code tape 136. The left region of trajectory 902 and right region of trajectory 904 may or may not be symmetric. The alternative trajectory 900 may be used to expand and/or update the virtual image-code tape 136 when the autonomous supply chain node vehicle 118 is not active in inventory transportation, according to one embodiment.

The autonomous supply chain node vehicle 118 may or may not be able to make sharp turns as shown in the example in FIG. 9. For a region (e.g., the region shown in FIG. 9 including the left region of trajectory 902 and the right region of trajectory 904), the autonomous supply chain node vehicle 118 may go through the region in multiple passes and perform updating using alternative trajectory 900 with sweeping coverage in those multiple passes. The alternative trajectory 900 used in those passes may be different. Separately, each alternative trajectory may cover a portion of the left region of trajectory 902 and a portion of the right region. When combined, the alternative trajectory 900 used in the multiple passes may progressively cover the left region of trajectory 902 and right region of trajectory 904 with increasing density, according to one embodiment.

Figure 10:
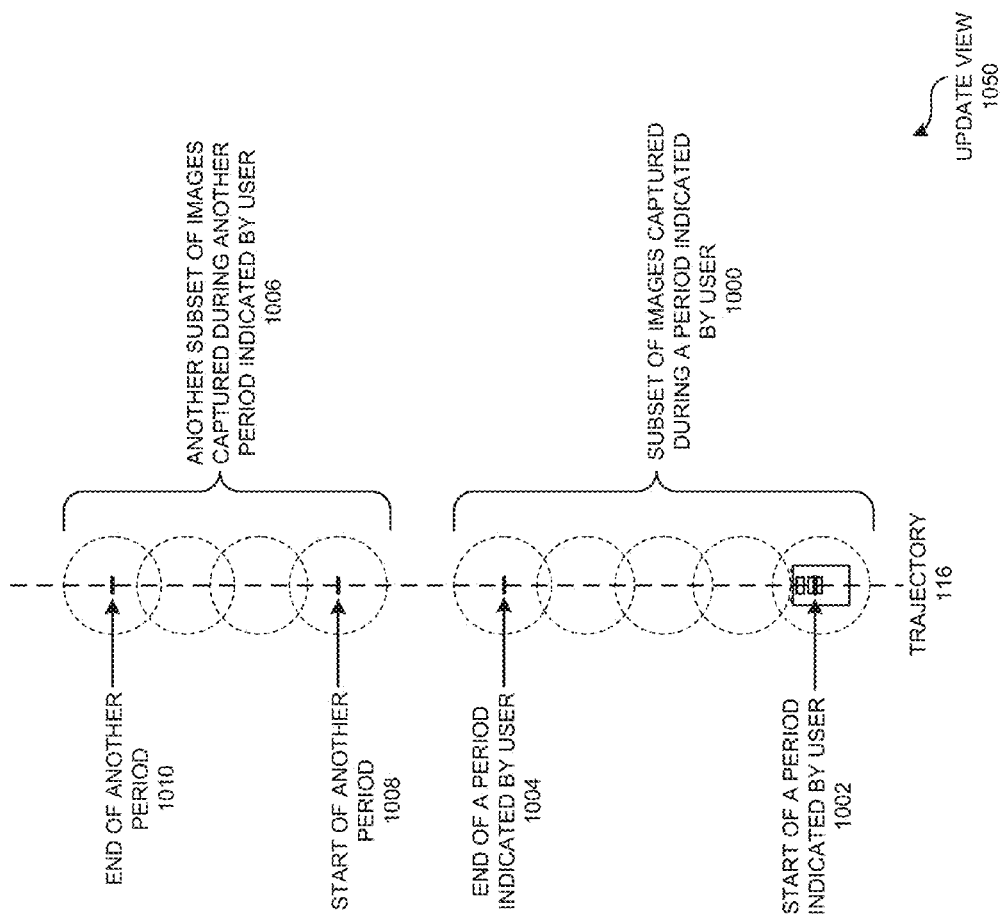
FIG. 10 is an update view of the autonomous supply chain node vehicle capturing images during periods indicated by a user to update and re-generate the virtual image-code tape of FIG. 1, according to one embodiment.

FIG. 10 is an update view 1050 of the autonomous supply chain node vehicle 118 capturing images during periods indicated by a user 101 to update and re-generate the virtual image-code tape 136 of FIG. 1, according to one embodiment.

Particularly, FIG. 10 builds on FIG. 1 and further adds a subset of images captured during a period indicated by user 1000, a start of a period indicated by user 1002, an end of period indicated by user 1004, another subset of images captured during another period indicated by user 1006, a start of another period 1008 and an end of another period 1010, according to one embodiment.

The subset of images captured during a period indicated by user 1000 may be used to update the GUIDs 138 of the virtual image-code tape 136. While the virtual image-code tape 136 contains identifiable image features of marks (e.g. floor texture marks 306A, side texture marks 306B and ceiling texture marks 306C) captured during the learning mode 1500, new marks may be added and old marks may be removed or covered over time. Thus the user 101 may direct the central inventory server 100 and/or the autonomous supply chain node vehicle 118 to use discrete overlapping images 129 captured during a period of time (e.g., marked by start of a period indicated by user 1002, and end of a period indicated by user 1004) to update the virtual image-code tape 136.

Sometimes the storage center 110 (e.g. the floor) may be renovated such that most, if not all, of the previous marks are no longer there. Sometimes the shelves (e.g. set of shelves 112) may be rearranged such that the trajectory 116 may need to be changed and the virtual image-code tape 136 may need to be regenerated. Sometimes the virtual image-code tape 136 may simply be outdated and the user 101 may want to generate a brand new virtual image-code tape (e.g., the virtual image-code tape 136). In that case, the user 101 may indicate a period (e.g., marked by start of another period 1008 and end of another period 1010) in which the subset of images captured during another period indicated by user 1006 will be used to regenerate the virtual image-code tape 136.

FIG. 10 illustrates that the virtual image-code tape 136 may be updated with a subset of the set of discrete overlapping images 129 captured during a period indicated by a user 101 (e.g., subset of images captured during a period indicated by user 1000). The virtual image-code tape 136 may be re-generated with another subset of the set of discrete overlapping images 129 captured during another period indicated by the user 101 (e.g., another subset of images captured during a period indicated by user 1006), according to one embodiment.

Figure 11:
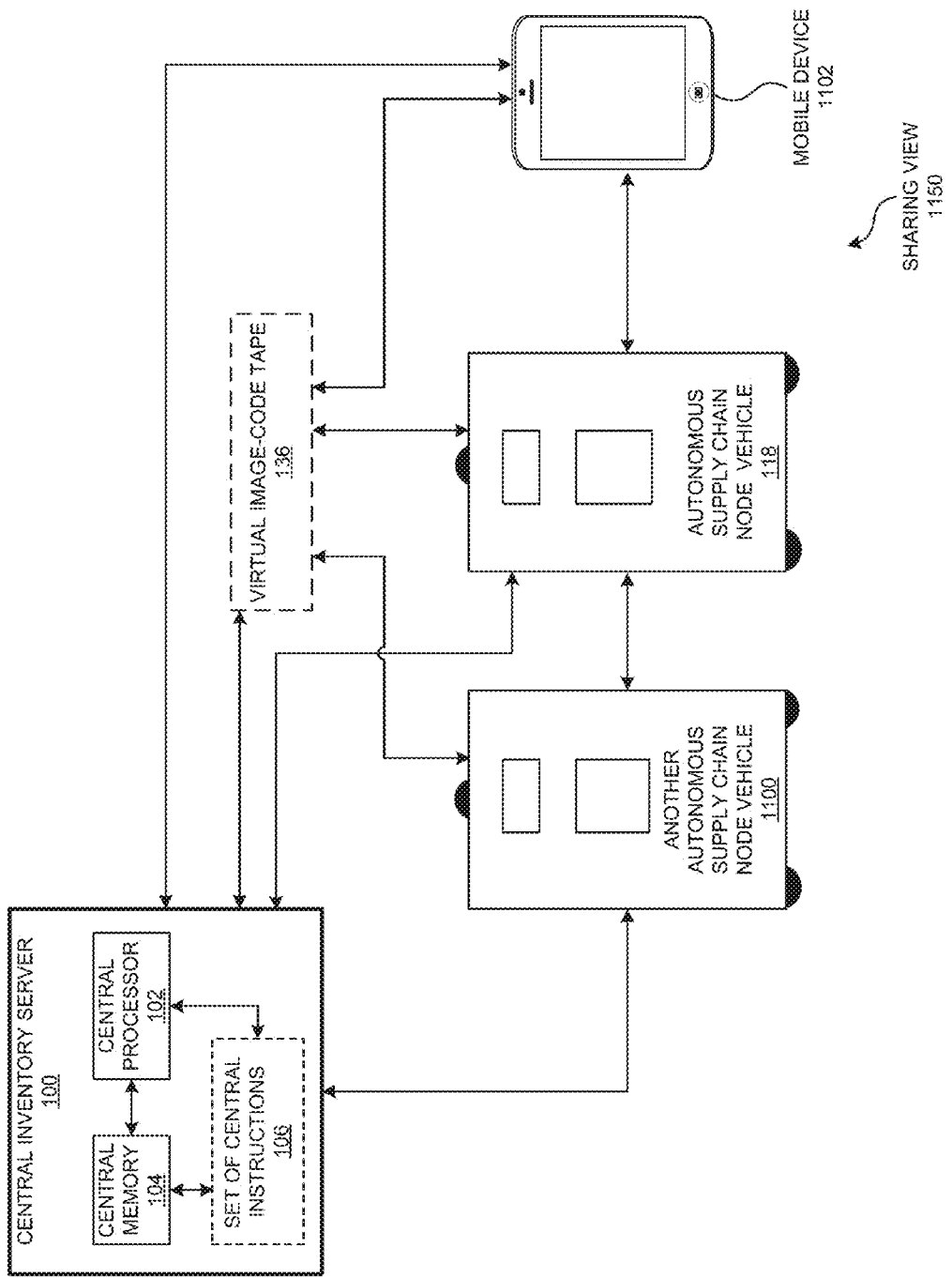
FIG. 11 is a sharing view of the autonomous supply chain node vehicle sharing the virtual image-code tape of FIG. 1 with another autonomous supply chain node vehicle and a mobile device, according to one embodiment.

FIG. 11 is a sharing view 1150 of the autonomous supply chain node vehicle 118 sharing the virtual image-code tape 136 of FIG. 1 with another autonomous supply chain node vehicle 1100 and a mobile device 1102, according to one embodiment.

Particularly, FIG. 11 builds on FIG. 1 and further adds another autonomous supply chain node vehicle 1100 and a mobile device 1102, according to one embodiment.

Another autonomous supply chain node vehicle 1100 may be another vehicle capable of moving around the storage center 110. It may be similar to the autonomous supply chain node vehicle 118.

A mobile device 1102 may be a generic term used to refer to a variety of devices that allow people to access data and information from wherever they are. This includes cell phones and portable devices (e.g., tablets, iPad®, smart camera, smart watch, smart glasses, smart devices). The mobile device 1102 may be communicatively connected with the autonomous supply chain node vehicle 118, according to one embodiment.

The central inventory server 100 may be communicatively coupled with another autonomous supply chain node vehicle 1100, the autonomous supply chain node vehicle 118 and with the mobile device 1102 using the virtual image-code tape 136. The central inventory server 100 may allow the virtual image-code tape 136 to be updated by the autonomous supply chain node vehicle 118. The central inventory server 100 may allow one, two or three of the autonomous supply chain node vehicle 118, another autonomous supply chain node vehicle 1100 and the mobile device 1102 to take part in updating the virtual image-code tape 136. The central inventory server 100 may allow one, two or three of the autonomous supply chain node vehicle 118, another autonomous supply chain node vehicle 1100 and the mobile device 1102 to take part in re-generating the virtual image-code tape 136, according to one embodiment.

FIG. 11 further illustrates sharing the virtual image-code tape 136 with another autonomous supply chain node vehicle 1100 and/or the mobile device 1102 communicatively connected with the autonomous supply chain node vehicle 118. The virtual image-code tape 136 may be jointly generated and/or updated with another autonomous supply chain node vehicle 1100 and/or the mobile device 1102, according to one embodiment.

Figure 12:
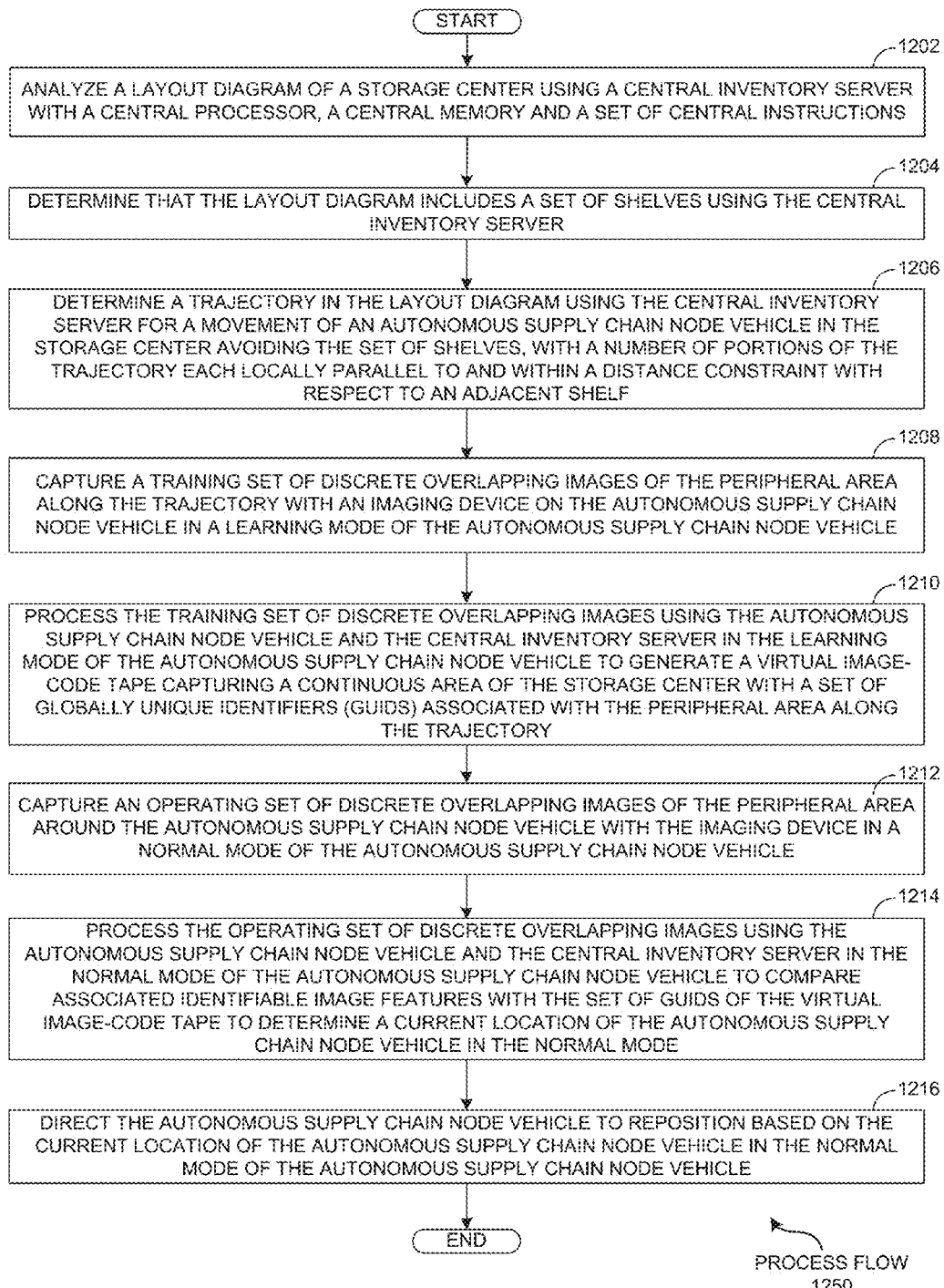
FIG. 12 is a process flow to direct the autonomous supply chain node vehicle to reposition with respect to the trajectory using the virtual image-code tape of FIG. 1, according to one embodiment.

FIG. 12 is a process flow 1250 to direct an autonomous supply chain node vehicle 118 to reposition with respect to a trajectory 116 using a virtual image-code tape 136 of FIG. 1, according to one embodiment.

In operation 1202, the method may analyze a layout diagram 108 of a storage center 110 using a central inventory server 100 with a central processor 102, a central memory 104 and a set of central instructions 106. In operation 1204, the method may determine that the layout diagram 108 includes a set of shelves 112 using the central inventory server 100. In operation 1206, a trajectory 116 may be determined in the layout diagram 108 using the central inventory server 100 for a movement of an autonomous supply chain node vehicle 120 in the storage center 110 avoiding the set of shelves 112, with a number of portions of the trajectory 122 each locally parallel to and within a distance constraint 126 with respect to an adjacent shelf 124. In operation 1208, a training set of discrete overlapping images 128 of the peripheral area 130 captured along the trajectory 116 with an imaging device 132 on the autonomous supply chain node vehicle 118 in a learning mode 1500 of the autonomous supply chain node vehicle 118, according to one embodiment.

In operation 1210, the training set of discrete overlapping images 128 may be processed using the autonomous supply chain node vehicle 118 and the central inventory server 100 in the learning mode 1500 of the autonomous supply chain node vehicle 118 to generate a virtual image-code tape 136 capturing a continuous area (e.g., continuous area along trajectory 600) of the storage center 110 with a set of globally unique identifiers (GUIDs) 138 associated with the peripheral area 130 along the trajectory 116. In operation 1212, an operating set of discrete overlapping images 127 of the peripheral area 130 may be captured around the autonomous supply chain node vehicle 118 with the imaging device 132 in a normal mode 1502 of the autonomous supply chain node vehicle 118, according to one embodiment.

In operation 1214, the operating set of discrete overlapping images 127 may be processed using the autonomous supply chain node vehicle 118 and the central inventory server 100 in the normal mode 1502 of the autonomous supply chain node vehicle 118 to compare associated identifiable image features 140 with the set of GUIDs 138 of the virtual image-code tape 136 to determine a current location 119 of the autonomous supply chain node vehicle 118 with respect to the trajectory 116 in the normal mode 1502. In operation 1216, the autonomous supply chain node vehicle 118 may be directed to reposition and/or move with respect to the trajectory 116 based on the current location 119 of the autonomous supply chain node vehicle 118 in the normal mode 1502 of the autonomous supply chain node vehicle 118, according to one embodiment.

Figure 13:
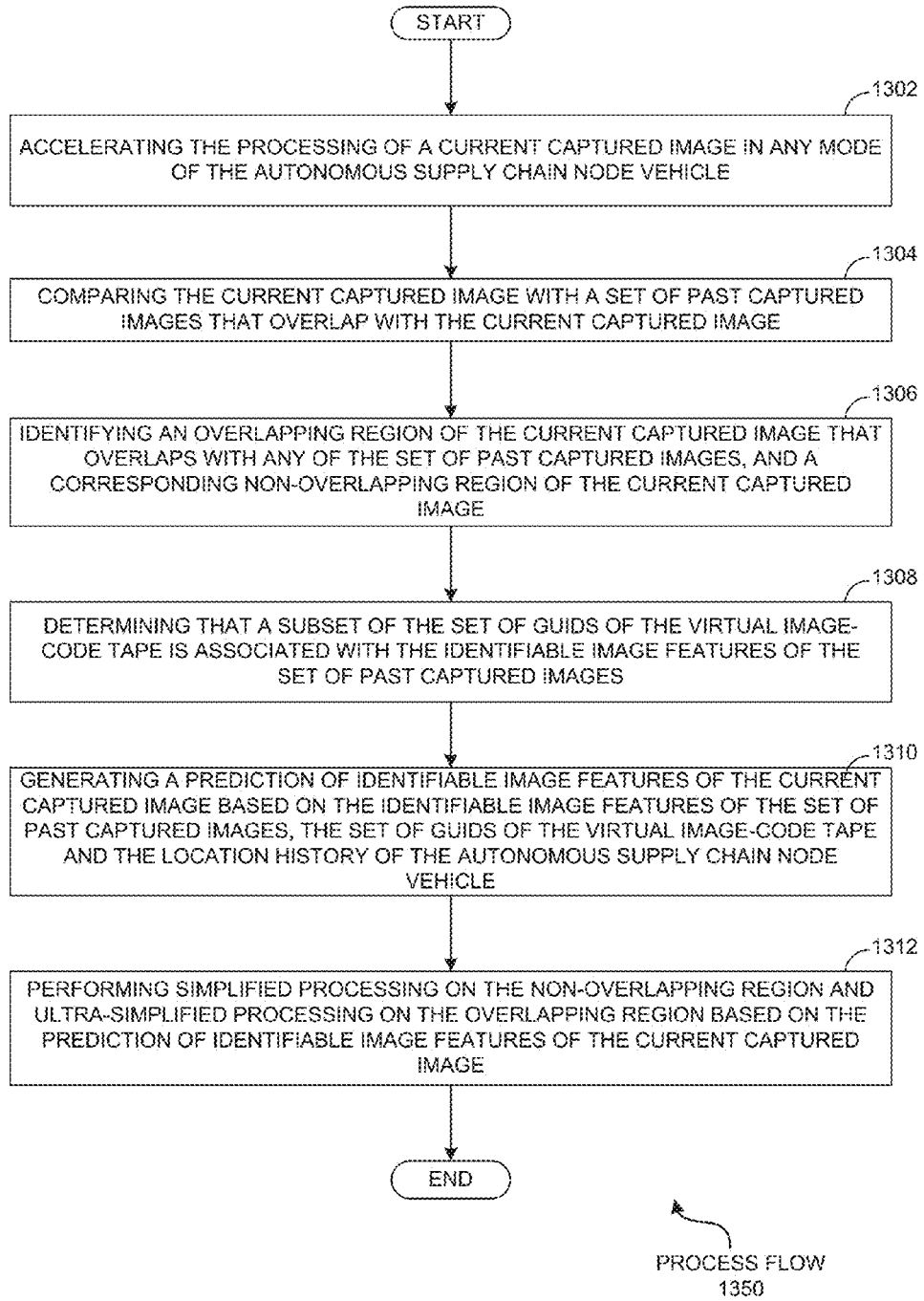
FIG. 13 is a process flow to accelerate the processing of the current captured image using overlapping past captured images and GUIDs of the virtual image-code tape of FIG. 1, according to one embodiment.

FIG. 13 is a process flow 1350 to accelerate the processing of a current captured image 604 using overlapping past captured images 606A-606B and GUIDs 610 of the virtual image-code tape 136 of FIG. 1, according to one embodiment.

In operation 1302, the processing of a current captured image 604 may be accelerated in any mode of the autonomous supply chain node vehicle 118. In operation 1304, the current captured image 604 may be compared with a set of past captured images 606A-606B that overlap with the current captured image 604. In operation 1306, an overlapping region 608 of the current captured image 604 that overlaps with any of the set of past captured images 606A-606B, and a corresponding non-overlapping region 616 of the current captured image 604 may be identified.

In operation 1308, the method may determine that a subset of the set of GUIDs 610 of the virtual image-code tape 136 is associated with identifiable image features 140 of the set of past captured images 606A-606B. In operation 1310, a prediction of identifiable image features 140 of the current captured image 604 may be generated based on identifiable image features 140 of the set of past captured images 606A-606B, the set of GUIDs 610 of the virtual image-code tape 136 and the location history of the autonomous supply chain node vehicle 118. In operation 1312, simplified processing on the non-overlapping region 616 and ultra-simplified processing on the overlapping region 608 may be performed based on the prediction of identifiable image features 140 of the current captured image 604, according to one embodiment.

Figure 14:
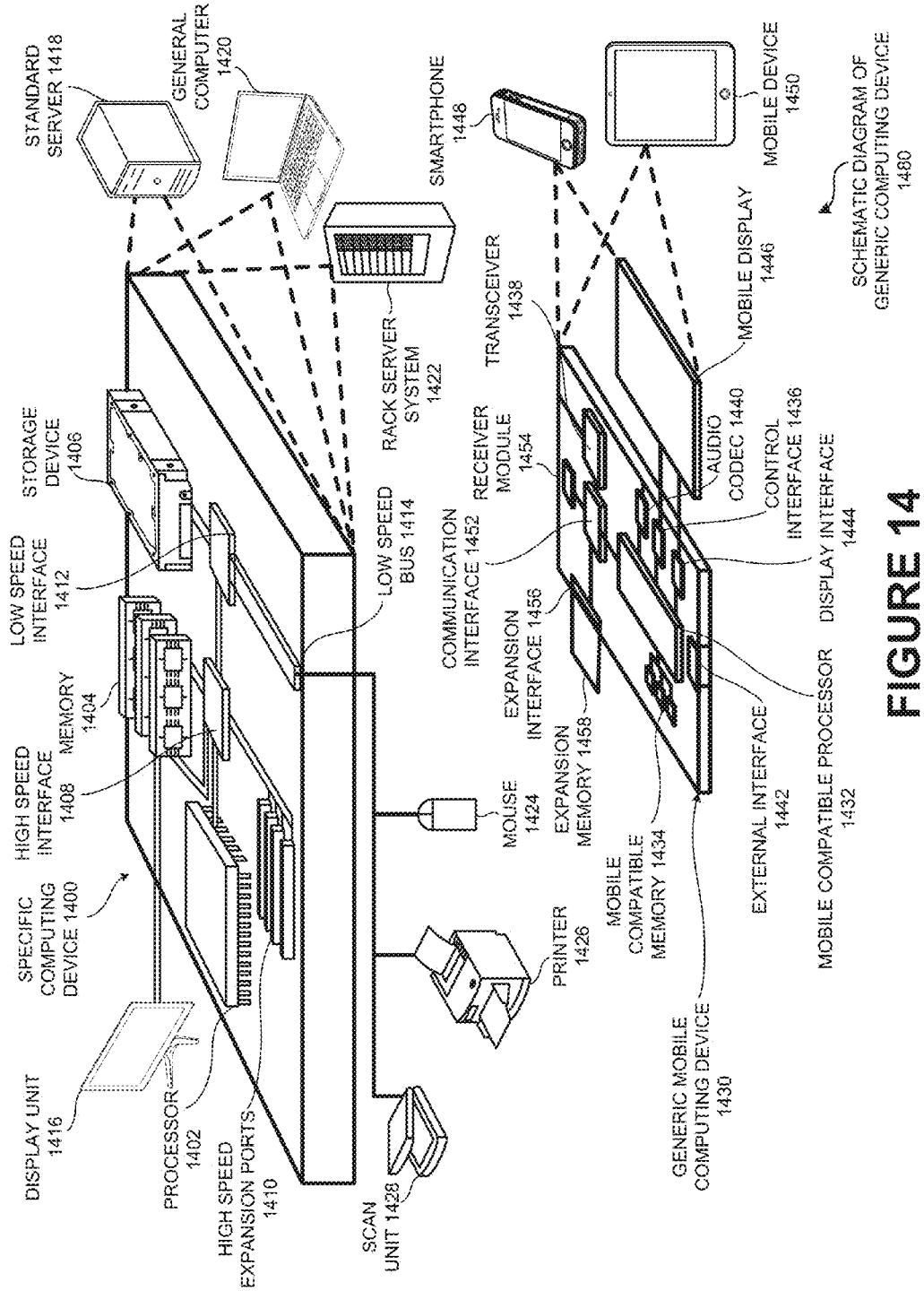
FIG. 14 is schematic diagram of a representative computing device that can be used to implement the methods and systems, according to one embodiment.

FIG. 14 is a schematic diagram 1480 of the specific computing devices 1400 and a mobile device 1430 that can be used to perform and/or implement any of the embodiments disclosed herein. In one or more embodiments, central inventory server 100 of FIG. 1 and/or reader device/mobile device 1102 of FIG. 11 may be the specific computing devices 1400.

The specific computing devices 1400 may represent various forms of digital computers, such as laptops, desktops, workstations, personal digital assistants, servers, blade servers, mainframes, and/or other appropriate computers. The mobile device 1430 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

The specific computing devices 1400 may include a processor 1402, a memory 1404, a storage device 1406, a high speed interface 1408 coupled to the memory 1404 and a plurality of high speed expansion ports 1410, and a low speed interface 1412 coupled to a low speed bus 1414 and a storage device 1406. In one embodiment, each of the components heretofore may be inter-coupled using various buses, and may be mounted on a common motherboard and/or in other manners as appropriate.

The processor 1402 may process instructions for execution in the specific computing devices 1400, including instructions stored in the memory 1404 and/or on the storage device 1406 to display a graphical information for a GUI on an external input/output device, such as a display unit 1416 coupled to the high speed interface 1408. In other embodiments, multiple processor(s) 1402 and/or multiple buses may be used, as appropriate, along with multiple memories and/or types of memory 1404. Also, a plurality of specific computing devices 1400 may be coupled with, with each device providing portions of the necessary operations (e.g., as a server bank, a group of blade servers, and/or a multi-processor system).

The memory 1404 may be coupled to the specific computing devices 1400. In one embodiment, the memory 1404 may be a volatile memory. In another embodiment, the memory 1404 may be a non-volatile memory. The memory 1404 may also be another form of computer-readable medium, such as a magnetic and/or an optical disk. The storage device 1406 may be capable of providing mass storage for the specific computing devices 1400.

In one embodiment, the storage device 1406 may be included of a floppy disk device, a hard disk device, an optical disk device, a tape device, a flash memory and/or other similar solid state memory device. In another embodiment, the storage device 1406 may be an array of the devices in a computer-readable medium previously mentioned heretofore, computer-readable medium, such as, and/or an array of devices, including devices in a storage area network and/or other configurations.

A computer program may be included of instructions that, when executed, perform one or more methods, such as those described above. The instructions may be stored in the memory 1404, the storage device 1406, a memory 1404 coupled to the processor 1402, and/or a propagated signal.

The high speed interface 1408 may manage bandwidth-intensive operations for the specific computing devices 1400, while the low speed interface 1412 may manage lower bandwidth-intensive operations. Such allocation of functions is exemplary only. In one embodiment, the high speed interface 1408 may be coupled to the memory 1404, the display unit 1416 (e.g., through a graphics processor and/or an accelerator), and to the plurality of high speed expansion ports 1410, which may accept various expansion cards.

In the embodiment, the low speed interface 1412 may be coupled to the storage device 1406 and the low speed bus 1414. The low speed bus 1414 may be included of a wired and/or wireless communication port (e.g., a Universal Serial Bus ("USB"), a Bluetooth® port, an Ethernet port, and/or a wireless Ethernet port). The low speed bus 1414 may also be coupled to scan unit 1428, a printer 1426, a keyboard, a mouse 1424, and a networking device (e.g., a switch and/or a router) through a network adapter.

The specific computing devices 1400 may be implemented in a number of different forms, as shown in the Figure. In one embodiment, the specific computing devices 1400 may be implemented as a standard server 1418 and/or a group of such servers. In another embodiment, the specific computing devices 1400 may be implemented as part of a rack server system 1422. In yet another embodiment, the specific computing devices 1400 may be implemented as a general computer 1420 such as a laptop and/or desktop computer. Alternatively, a component from the specific computing devices 1400 may be combined with another component in a mobile device 1430.

In one or more embodiments, an entire system may be made up of a plurality of specific computing devices 1400 and/or a plurality of specific computing devices 1400 coupled to a plurality of mobile device 1430.

In one embodiment, the mobile device 1430 may include a mobile compatible processor 1432, a mobile compatible memory 1434, and an input/output device such as a mobile display 1446, a communication interface 1452, and a transceiver 1438, among other components. The mobile device 1430 may also be provided with a storage device, such as a Microdrive and/or other device, to provide additional storage. In one embodiment, the components indicated heretofore are inter-coupled using various buses, and several of the components may be mounted on a common motherboard.

The mobile compatible processor 1432 may execute instructions in the mobile device 1430, including instructions stored in the mobile compatible memory 1434. The mobile compatible processor 1432 may be implemented as a chipset of chips that include separate and multiple analog and digital processors. The mobile compatible processor 1432 may provide, for example, for coordination of the other components of the mobile device 1430, such as control of user interfaces, applications run by the mobile device 1430, and wireless communication by the mobile device 1430.

The mobile compatible processor 1432 may communicate with a user 101 through the control interface 1436 and the display interface 1444 coupled to a mobile display 1446. In one embodiment, the mobile display 1446 may be a Thin-Film-Transistor Liquid Crystal Display ("TFT LCD"), an Organic Light Emitting Diode ("OLED") display, and another appropriate display technology. The display interface 1444 may include appropriate circuitry for driving the mobile display 1446 to present graphical and other information to a user 101.

The control interface 1436 may receive commands from a user 101 and convert them for submission to the mobile compatible processor 1432. In addition, an external interface 1442 may be provided in communication with the mobile compatible processor 1432, so as to enable near area communication of the mobile device 1430 with other devices. External interface 1442 may provide, for example, for wired communication in some embodiments, and/or for wireless communication in other embodiments, and multiple interfaces may also be used.

The mobile compatible memory 1434 may be coupled to the mobile device 1430. The mobile compatible memory 1434 may be implemented as a volatile memory and a non-volatile memory. The expansion memory 1458 may also be coupled to the mobile device 1430 through the expansion interface 1456, which may include, for example, a Single In Line Memory Module ("SIMM") card interface. The expansion memory 1458 may provide extra storage space for the mobile device 1430, and/or may also store an application and/or other information for the mobile device 1430.

Specifically, the expansion memory 1458 may include instructions to carry out the processes described above. The expansion memory 1458 may also include secure information. For example, the expansion memory 1458 may be provided as a security module for the mobile device 1430, and may be programmed with instructions that permit secure use of the mobile device 1430. In addition, a secure application may be provided on the SIMM card, along with additional information, such as placing identifying information on the SIMM card in a non-hackable manner.

The mobile compatible memory 1434 may include a volatile memory (e.g., a flash memory) and a non-volatile memory (e.g., a non-volatile random-access memory ("NVRAM")). In one embodiment, a computer program includes a set of instructions that, when executed, perform one or more methods. The set of instructions may be stored on the mobile compatible memory 1434, the expansion memory 1458, a memory coupled to the mobile compatible processor 1432, and a propagated signal that may be received, for example, over the transceiver 1438 and/or the external interface 1442.

The mobile device 1430 may communicate wirelessly through the communication interface 1452, which may be included of a digital signal processing circuitry. The communication interface 1452 may provide for communications using various modes and/or protocols, such as: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 1438 (e.g., radio-frequency transceiver). In addition, short-range communication may occur, such as using a Bluetooth®, Wi-Fi, and/or other such transceiver. In addition, a GPS ("Global Positioning System") receiver module may provide additional navigation-related and location-related wireless data to the mobile device 1430, which may be used as appropriate by a software application running on the mobile device 1430.

The mobile device 1430 may also communicate audibly using an audio codec 1440, which may receive spoken information from a user 101 and convert it to usable digital information. The audio codec 1440 may likewise generate audible sound for a user 101, such as through a speaker (e.g., in a handset of the mobile device 1430). Such a sound may include a sound from a voice telephone call, a recorded sound (e.g., a voice message, a music files, etc.) and may also include a sound generated by an application operating on the mobile device 1430.

The mobile device 1430 may be implemented in a number of different forms, as shown in the figure. In one embodiment, the mobile device 1430 may be implemented as a smartphone 1448. In another embodiment, the mobile device 1430 may be implemented as a personal digital assistant ("PDA"). In yet another embodiment, the mobile device, 1430 may be implemented as a tablet device.

Figure 15A:
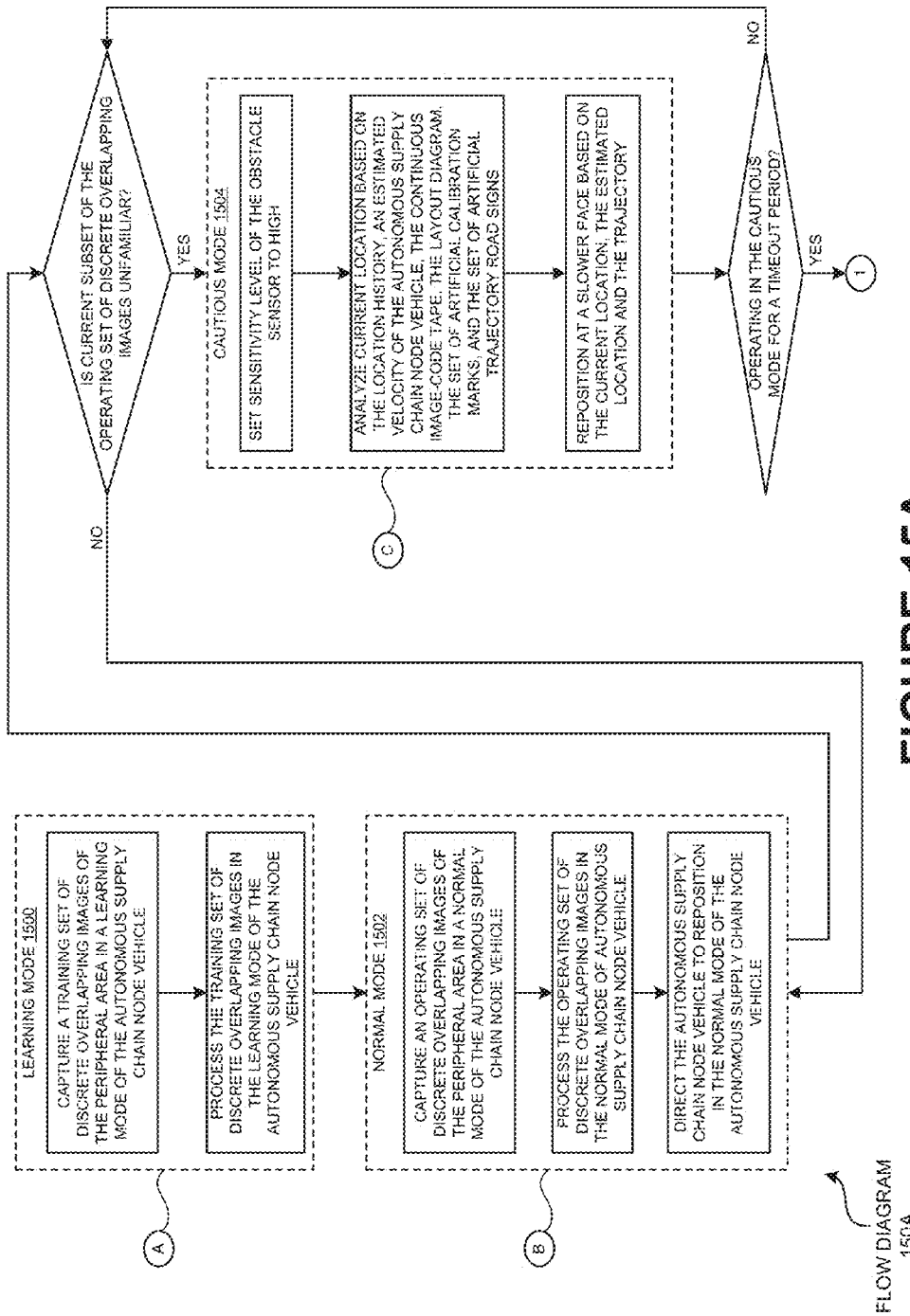
FIGS. 15A and 15B are a flow diagram of the transitions among the four modes: learning mode, normal mode, cautious mode, and lost mode, according to one embodiment.
Figure 15B:
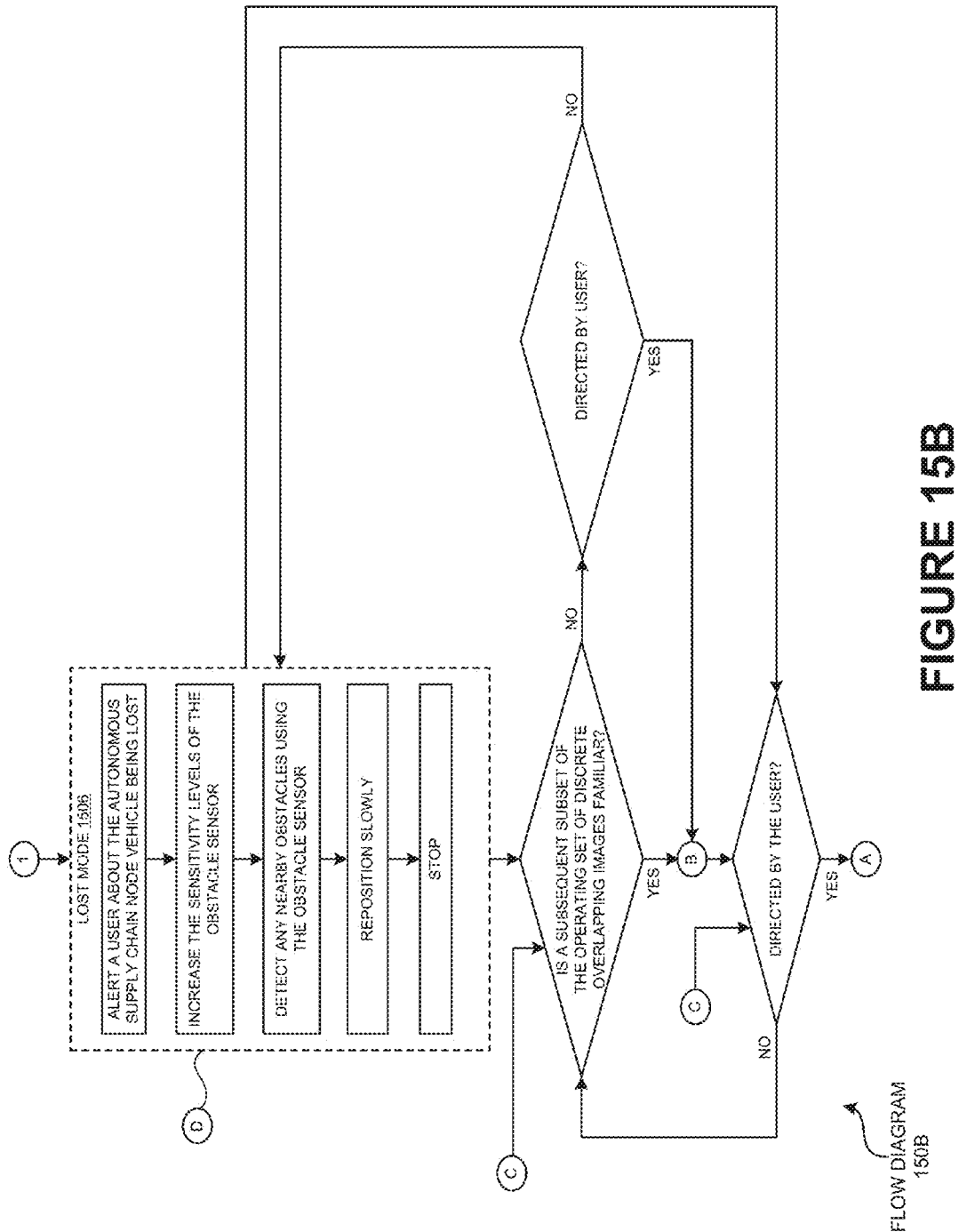
Figure 16A:
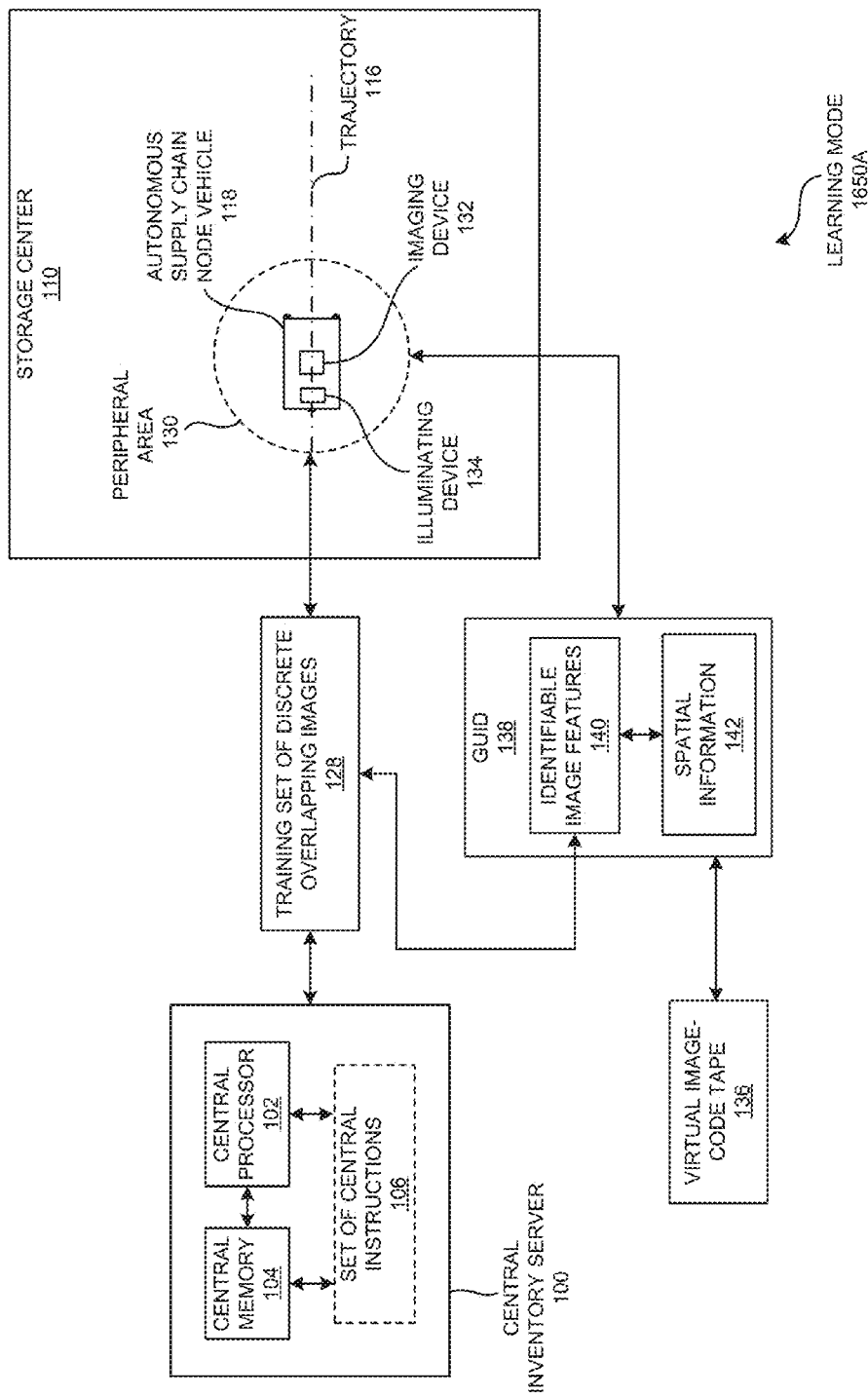
FIG. 16A is a flow diagram illustrating the learning mode, according to one embodiment.
Figure 16B:
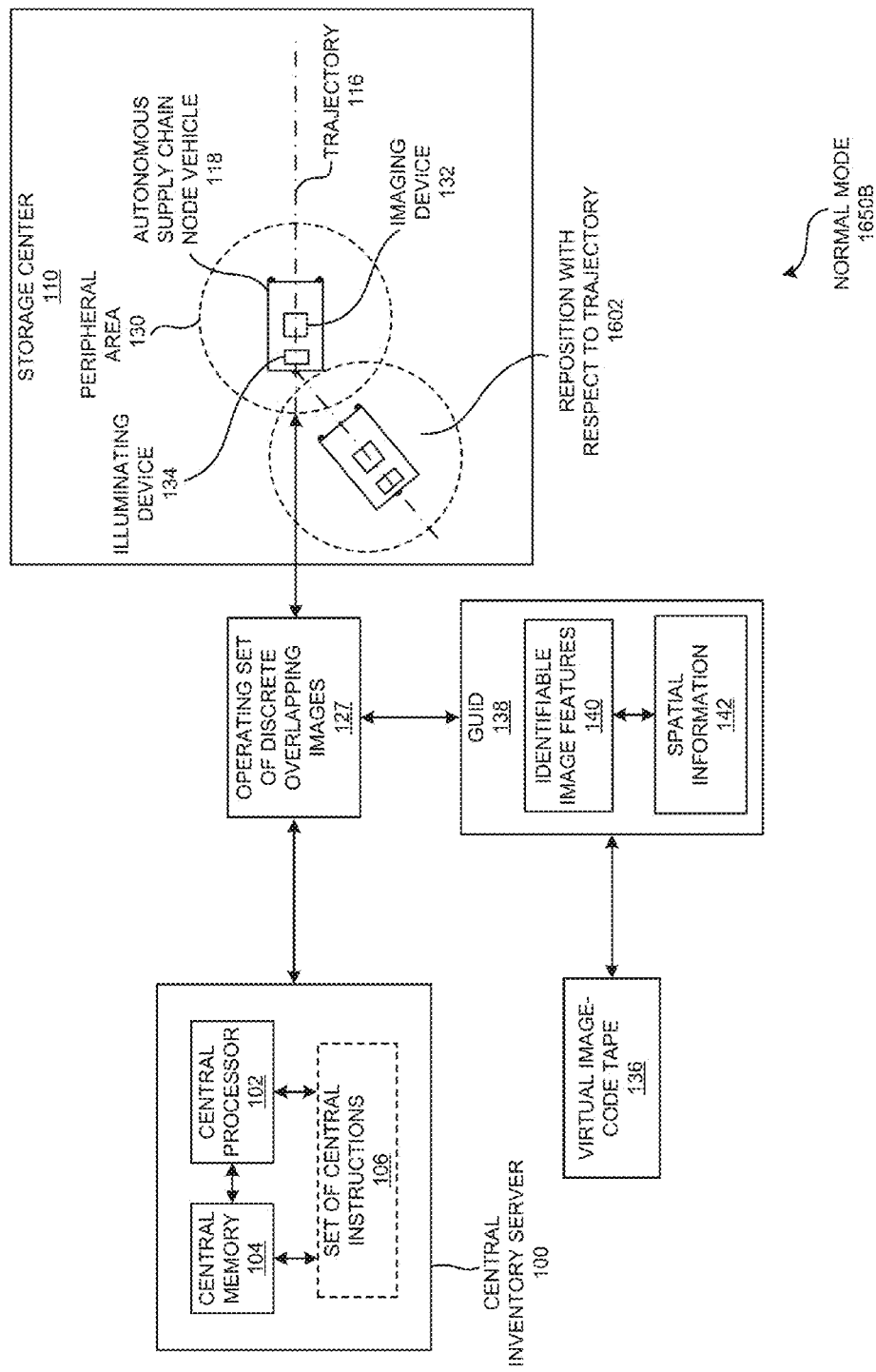
FIG. 16B is a flow diagram illustrating the normal mode, according to one embodiment.
Figure 16C:
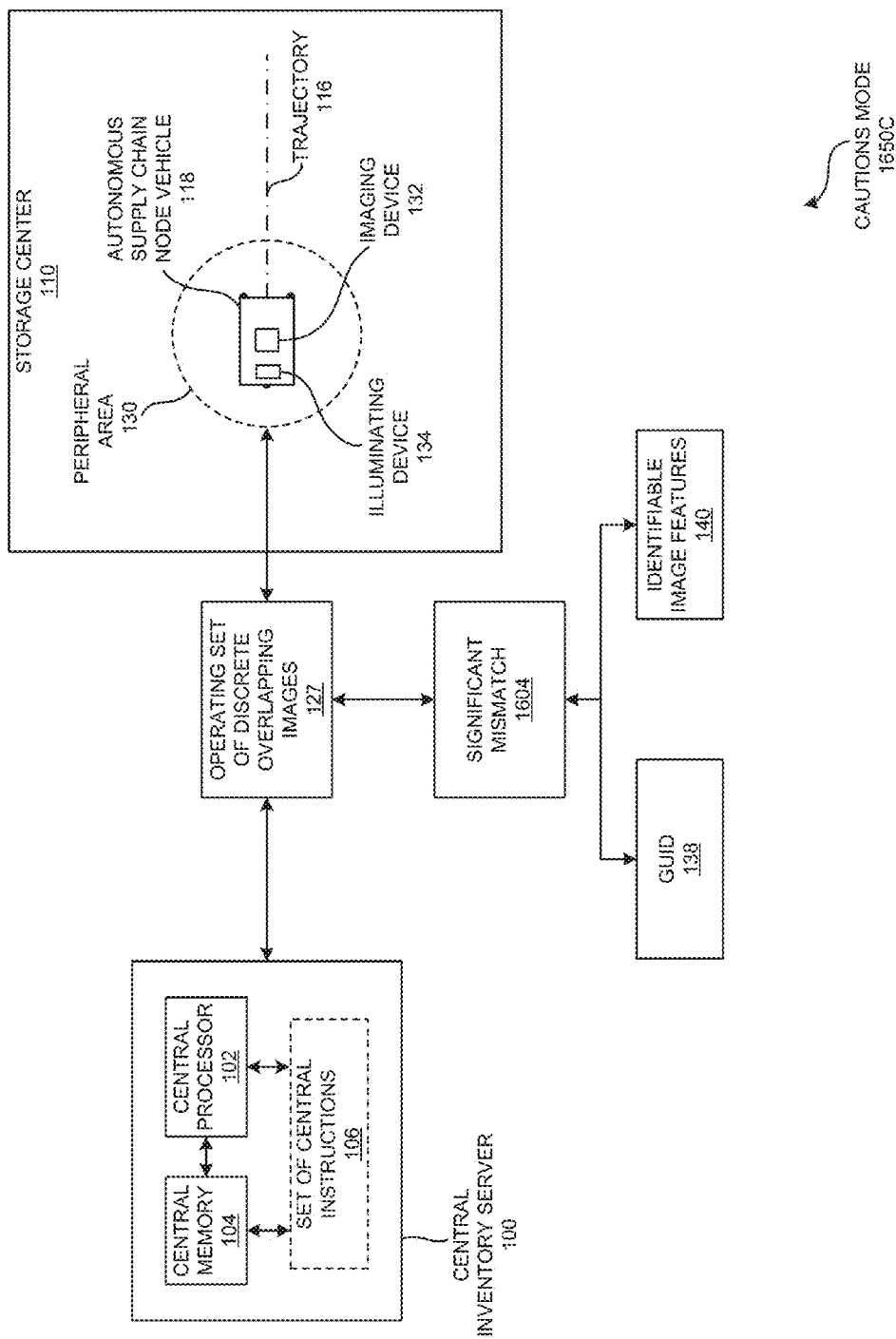
FIG. 16C is a flow diagram illustrating the cautious mode, according to one embodiment.
Figure 16D:
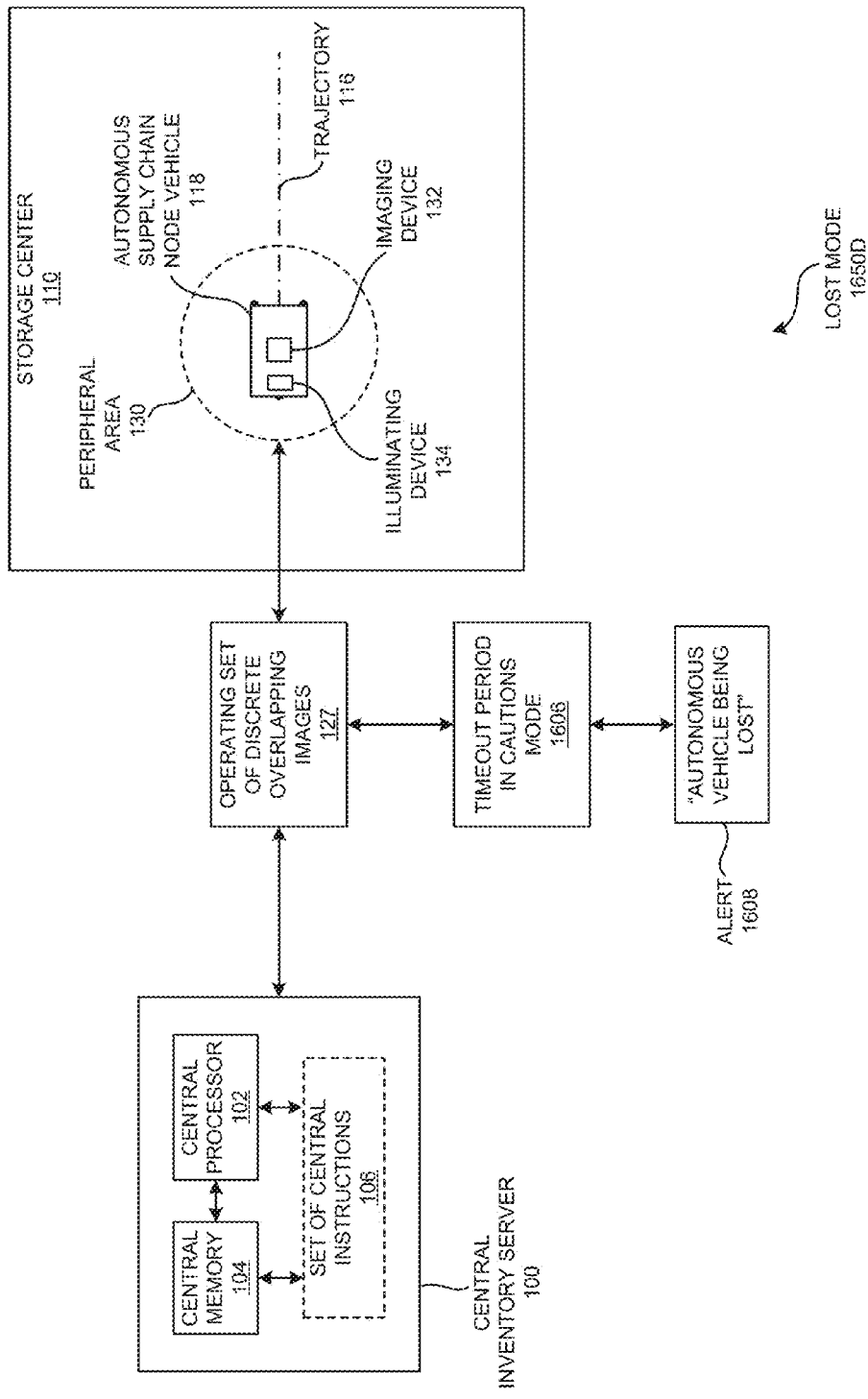
FIG. 16D is a flow diagram illustrating the lost mode, according to one embodiment.

FIGS. 15A and 15B are a flow diagram showing the transitions among the four modes: learning mode 1500, normal mode 1502, cautious mode 1504 and lost mode 1506, according to one embodiment.

FIGS. 16A, 16B, 16C and 16D are the corresponding mode views 1650A-1650D of the learning mode 1500, normal mode 1502, cautious mode 1504 and lost mode 1506, according to one embodiment.

Particularly, FIGS. 15A and 15B builds on FIG. 1 and further adds a learning mode 1500, a normal mode 1502, a cautious mode 1504 and a lost mode 1506, according to one embodiment.

The learning mode 1500 may be used to capture and process a training set of discrete overlapping images 128 of the peripheral area 130 along a trajectory 116 in a storage center 110 to build a virtual image-code tape 136 of a continuous area along the trajectory 600. The virtual image-code tape may include a set of GUIDs 138 and a set of spatial information 142, according to one embodiment.

After the learning mode 1500, the normal mode 1502 may be used to perform navigation along the trajectory 116 in the storage center 110. The normal mode 1502 may capture and process an operating set of discrete overlapping images 127 of the peripheral area 130 around the autonomous supply chain node vehicle 118. It may compare the identifiable image features 140 of the discrete overlapping images 129 with the GUIDs 138 of the virtual image-code tape 136. The current location 119 may be computed based on the spatial information 142 associated with the matching GUIDs 138. The autonomous supply chain node vehicle may reposition with respect to the trajectory 1602, according to one embodiment.

During the normal mode 1502, if a current subset (e.g., the current captured image 604, past captured images 606A-606B) of the operating set of discrete overlapping images 127 is familiar, the autonomous supply chain node vehicle 118 may remain in the normal mode 1502. If the current subset of the operating set of discrete overlapping images 127 becomes unfamiliar having significant mismatch 1604 between the associated identifiable image features 140 and the set of GUIDs 138 of the virtual image-code tape 136, the autonomous supply chain node vehicle 118 may enter a cautious mode 1504, according to one embodiment.

In the cautious mode 1504, the sensitivity level of the obstacle sensor 802 (as shown in FIG. 8) may be set to high. The current location 119 may be analyzed based on the location history of the autonomous supply chain node vehicle 118, an estimated velocity of the autonomous supply chain node vehicle 118, the virtual image-code tape 136, the layout diagram 108, the set of artificial calibration marks 302A-302C, and/or the set of artificial trajectory road signs 304A-304C. The autonomous supply chain node vehicle 118 may reposition and/or move at a slower pace based on the current location 119, the location analysis, and/or the trajectory 116, according to one embodiment.

If the autonomous supply chain node vehicle 118 has operated for a timeout period in the cautious mode 1606, the autonomous supply chain node vehicle 118 may enter the lost mode 1506, according to one embodiment.

In the lost mode 1506, a user 101 may be alerted 1608 about the autonomous supply chain node vehicle 118 being lost. Sensitivity levels of the obstacle sensor 802 may be further increased. Any nearby obstacles may be detected using the obstacle sensor 802. The autonomous supply chain node vehicle 118 may reposition and/or move very slowly and may stop, according to one embodiment.

The autonomous supply chain node vehicle 118 may change from any one of the lost mode 1506 and/or the cautious mode 1504 to the normal mode 1502 when a subsequent subset of the operating set of discrete overlapping images 127 is determined to be familiar having sufficient similarity between the associated identifiable image features 140 and/or the set of GUIDs 138 of the virtual image-code tape 136, according to one embodiment.

The autonomous supply chain node vehicle 118 may change from any one of the lost mode 1506 and/or the cautious mode 1504 to the normal mode 1502 when directed by the user 101, according to one embodiment.

In the normal mode 1502, the sensitivity level of the obstacle sensor 802 may be set to normal. The autonomous supply chain node vehicle 118 may reposition and/or move at a normal pace with respect to the trajectory 116, according to one embodiment.

The autonomous supply chain node vehicle 118 may change from any one of the normal mode 1502, the cautious mode 1504, and/or the lost mode 1506 to the learning mode 1500 when directed by the user 101, according to one embodiment.

An example embodiment will now be described. A company called eGreatHome may be an online company in the USA that owns a distribution center with retail operation, which is a storage center 110, in San Francisco to serve its customers in Northern California. The storage center 110 may contain a set of shelves 112 to store inventory items with the help of the central inventory server 100 and the autonomous supply chain node vehicle 118. Periodically, its merchandise shipment may arrive in large quantity from Asia and South America and may be moved from the loading bay to the shelves using the autonomous supply chain node vehicle. When customers (e.g., small retail stores and/or individual consumers) who might place their order online come to the storage center 110 to pick up the order, the central inventory server 100 may direct the autonomous supply chain node vehicle 100 to go to different shelves (e.g., set of shelves 112) to pick up various inventory items, as ordered.

The storage center 110 may be smart, with advance tools to streamline operation and to control cost. The autonomous supply chain node vehicle 118 may be smart, and may follow instructions from the central inventory server 100 to navigate in the storage center 110 along the trajectory 116 that may avoid hitting the set of shelves 112, using floor texture marks 306A to match against a reference virtual image-code tape (e.g., the virtual image-code tape 136) to compute the current location 119 in real time. As such, the autonomous supply chain node vehicle 118 may go to various shelves (e.g., set of shelves 112) to fetch various items as ordered by the customers. The autonomous supply chain node vehicle 118 may be equipped with robotic arms to load and/or unload the inventory items. The set of shelves 112 may be smart, and may be equipped with robotic arms and/or elevators to help to move inventory items up/down the set of shelves 112 for loading onto/unloading from the autonomous supply chain node vehicle 118.

Johnny, an eGreatHome staff, may be the user 101 who remotely controls the central inventory server 100 and remotely controls the autonomous supply chain node vehicle 118. During the set-up stage, Johnny may arrange the set of shelves 112 according to a layout diagram 108 of the storage center 110. He may analyze the digitized layout diagram (e.g., the layout diagram 108) of the storage center 110 using the central inventory server 100 and may determine a trajectory 116 for the autonomous supply chain node vehicle 118 to navigate to the set of shelves 112 without hitting the set of shelves 112. He may guide the autonomous supply chain node vehicle 118 manually along the trajectory 116 and may direct an imaging device 132 on the autonomous supply chain node vehicle 118 to capture a training set of discrete overlapping images 128 of the floor in the learning mode 1500 of the autonomous supply chain node vehicle 118. He may input the spatial information 142 at various check-points into the central inventory server 100 and/or the autonomous supply chain node vehicle 118. With the training set of discrete overlapping images 128 and the set of manually entered spatial information 142, the central inventory server 100 and the autonomous supply chain node vehicle 118 may generate jointly a reference virtual image-code tape (e.g., the virtual image-code tape 136) which may function as a navigation map of the storage center 110, with map information available for a continuous area along the trajectory 600, which may be sufficient for travelling along the trajectory 116.

During daily operation, when a shipment may arrive, Johnny may control the central inventory server 100 and may pilot the autonomous supply chain node vehicle 118 in the normal mode 1502 of the autonomous supply chain node vehicle 118 to load up the inventory items from the loading bay, navigate to particular shelves and unload the inventory items. Johnny may steer the robotic arms to perform the loading and unloading of inventory items. During the navigation, the imaging device 132 of the autonomous supply chain node vehicle 118 may capture images and compare the images with the reference virtual image-code tape (e.g., the virtual image-code tape 136). When a match is found, the corresponding spatial information 142 may be used to infer the current location 119. The autonomous supply chain node vehicle 118 may thus travel in the storage center 110 in a self-guided manner using the virtual image-code tape 136. Using the accelerated processing described in claim 5, the battery on the autonomous supply chain node vehicle may last longer before a next charging of the battery is needed which in turn leads to higher productivity.

Occasionally, part of the floor marks may be covered by some debris such as loose papers and/or cardboards and the autonomous supply chain node vehicle 118 may enter the cautious mode 1504 momentarily and may move slowly. After the autonomous supply chain node vehicle 118 moves slowly past the debris, the autonomous supply chain node vehicle 118 may recognize the familiar floor marks again and may return from the cautious mode 1504 to the normal mode 1502.

Very rarely, eGreatHome may renovate the floor erasing all the past floor texture marks 306A the autonomous supply chain node vehicle 118 learned in the past training set of discrete overlapping images 128. The autonomous supply chain node vehicle 118 may enter the cautious mode 1504 and eventually the lost mode 1506 and notify Johnny. Johnny may realize that re-learning is needed and may direct the autonomous supply chain node vehicle 118 to enter the training mode 1500. He may guide the autonomous supply chain node vehicle 118 manually along the trajectory 116 and may direct the imaging device 132 on the autonomous supply chain node vehicle 118 to capture a new training set of discrete overlapping images 128 of the floor in the learning mode 1500 of the autonomous supply chain node vehicle 118. When the re-training is finished, Johnny directs the autonomous supply chain node vehicle 118 to enter the normal mode 1502.

Various embodiments of the methods and system described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, an input device, and/or an output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user 101, the systems and techniques described here may be implemented on a computing device having a display device (e.g., a cathode ray tube ("CRT") and/or liquid crystal ("LCD") monitor) for displaying information to the user 101 and a keyboard and a mouse by which the user 101 can provide input to the computer. Other kind of devices can be used to provide for interaction with a user 101 as well. For example, feedback provided to the user 101 can be any form of sensory feedback (e.g., visual feedback, auditory feedback, and/or tactile feedback) and input from the user 101 can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user 101 can interact with an embodiment of the systems and techniques described here), and a combination thereof. The components of the system may also be coupled through a communication network.

The communication network may include a local area network ("LAN") and/or a wide area network ("WAN") (e.g., the Internet). The computing system can include a client and/or a server. In one embodiment, the client and/or the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, device and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method comprising:
analyzing a layout diagram of a storage center using a central inventory server with a central processor, a central memory and a set of central instructions;
determining that the layout diagram includes a set of shelves;
determining a trajectory in the layout diagram for a movement of an autonomous supply chain node vehicle in the storage center avoiding the set of shelves, with a number of portions of the trajectory each locally parallel to and within a distance constraint with respect to an adjacent shelf;
wherein the central inventory server is communicatively connected with the autonomous supply chain node vehicle;
wherein the autonomous supply chain node vehicle has an embedded processor, an embedded memory and a set of embedded instructions;
capturing a training set of discrete overlapping images of the peripheral area along the trajectory with an imaging device on the autonomous supply chain node vehicle in a learning mode of the autonomous supply chain node vehicle;
processing the training set of discrete overlapping images using the autonomous supply chain node vehicle and the central inventory server in the learning mode of the autonomous supply chain node vehicle to generate a virtual image-code tape capturing a continuous area of the storage center with a set of globally unique identifiers (GUIDs) associated with the peripheral area along the trajectory;
wherein the set of GUIDs comprises identifiable image features associated with the training set of discrete overlapping images and a set of spatial information of the identifiable image features in the storage center;
capturing an operating set of discrete overlapping images of the peripheral area around the autonomous supply chain node vehicle with the imaging device in a normal mode of the autonomous supply chain node vehicle;
processing the operating set of discrete overlapping images using the autonomous supply chain node vehicle and the central inventory server in the normal mode of the autonomous supply chain node vehicle to compare associated identifiable image features with the set of GUIDs of the virtual image-code tape to determine a current location of the autonomous supply chain node vehicle in the normal mode; and
directing the autonomous supply chain node vehicle to reposition with respect to the trajectory based on the current location of the autonomous supply chain node vehicle in the normal mode of the autonomous supply chain node vehicle.

2. The method in claim 1 further comprises:
using an illuminating device to provide illumination for the imaging device;
wherein the imaging device comprises imaging sensors to capture the set of discrete overlapping images using at least one of visible light, infra-red, ultra-violet, microwave, sound, ultra sound, radar, laser, shock wave, mechanical vibration, and other electromagnetic radiation in at least one band in a frequency spectrum;
wherein the illuminating device comprises energy sources to emit at least one of visible light, infra-red, ultraviolet, microwave, sound, ultra sound, radar, laser, shock wave, mechanical vibration, and the other electromagnetic radiation in at least one band in the frequency spectrum.

3. The method in claim 1, wherein:
the imaging device to capture at least one of:
down-view images of the floor with:
a set of floor artificial calibration marks,
a set of floor artificial trajectory road signs, and
a set of floor texture marks comprising scratch marks, swirl marks, scuff marks, stains, grease traces, debris, dirt patterns, tape marks, footprints, shoeprints, dye marks, rubber marks, depression marks, junctions, floor cracks, wood grains, carpet textures, vinyl patterns, concrete grains, tile patterns, floor signages, floor arts, exposed hardware parts, shadows and shades,
side-view images of the shelves and side walls with:
a set of side artificial calibration marks,
a set of side artificial trajectory road signs, and
a set of side texture marks comprising shelves, structural features, wall texture, doors, windows, cables, furniture, tables, chairs, computers, air ducts, curtains, signages, boards, posters, displays, decorations, light fixtures, switches, shadows and shades, and
up-view images of the ceiling with:
a set of ceiling artificial calibration marks,
a set of ceiling artificial trajectory road signs, and
a set of ceiling texture marks comprising structural features, beam features, smoke marks, fume marks, fire sprinklers, bells, windows, fans, switches, cables, light fixtures, cameras, signages, air ducts, water pipes, tiles, vents, WiFi routers, projectors, shadows and shades.

4. The method in claim 1, further comprising:
preprocessing the discrete overlapping images in any mode of the autonomous supply chain node vehicle using a set of spatially varying preprocessing parameters before the processing; and
processing any set of discrete overlapping images in any mode of the autonomous supply chain node vehicle:
performing at least one of extraction, combination, representation, coding and comparing of associated identifiable image features,
using at least one of feature extraction, edge detection, image matching, predictive matching, image fusion, image stitching, image sprite forming, panoramic photography, feature encoding, feature compression, robust processing, and using a set of spatially varying processing parameters;

wherein the set of spatially varying preprocessing parameters and the set of spatially varying processing parameters are spatially varying according to at least one of:

a location history of the autonomous supply chain node vehicle, a classification of the autonomous supply chain node vehicle, a state of the autonomous supply chain node vehicle, a type of the imaging device, a state of the imaging device, a type of an illuminating device, a state of the illuminating device, and a condition of the storage center.

5. The method in claim 1, further comprising:

accelerating the processing of a current captured image in any mode of the autonomous supply chain node vehicle by:

comparing the current captured image with a set of past captured images that overlap with the current captured image, identifying an overlapping region of the current captured image that overlaps with any of the set of past captured images, and a corresponding non-overlapping region of the current captured image, determining that a subset of the set of GUIDs of the virtual image-code tape is associated with identifiable image features of the set of past captured images, generating a prediction of identifiable image features of the current captured image based on identifiable image features of the set of past captured images, the set of GUIDs of the virtual image-code tape and the location history of the autonomous supply chain node vehicle, and performing simplified processing on the non-overlapping region and ultra-simplified processing on the overlapping region based on the prediction of identifiable image features of the current captured image.

6. The method in claim 1, further comprising:

directing the autonomous supply chain node vehicle to:

detect any deviation of the autonomous supply chain node vehicle from the trajectory according to the comparing of associated identifiable image features of the operating set of discrete overlapping images with the set of GUIDs of the virtual image-code tape;

move towards the trajectory when an unintentional deviation from the trajectory is detected;

detect any obstacle using an obstacle sensor;

deviate intentionally from the trajectory temporarily to avoid obstacles along the trajectory when such obstacles are detected by the obstacle sensor; and update the virtual image-code tape with a subset of the operating set of discrete overlapping images captured during any deviation from the trajectory.

7. The method in claim 1, further comprising:

directing the autonomous supply chain node vehicle to:

change from the normal mode to a cautious mode when a current subset of the operating set of discrete overlapping images is determined to be unfamiliar having significant mismatch between the associated identifiable image features and the set of GUIDs of the virtual image-code tape:

setting sensitivity level of the obstacle sensor to high, analyzing the current location based on at least one of the location history of the autonomous supply chain node vehicle, an estimated velocity of the autonomous supply chain node vehicle, the virtual image-code tape, the layout diagram, the set of artificial calibration marks, and the set of artificial trajectory road signs, and repositioning at a slower pace based on the current location, the location analysis, and the trajectory, change from the cautious mode to a lost mode after operating in the cautious mode for a timeout period:

alerting a user about the autonomous supply chain node vehicle being lost, increasing the sensitivity levels of the obstacle sensor, detecting any nearby obstacles using the obstacle sensor, repositioning slowly, and stopping, change from any one of the lost mode and the cautious mode to the normal mode when a subsequent subset of the operating set of discrete overlapping images is determined to be familiar having sufficient similarity between the associated identifiable image features and the set of GUIDs of the virtual image-code tape:

setting the sensitivity level of the obstacle sensor to normal, repositioning at a normal pace, and change from any one of the normal mode, the cautious mode, and the lost mode to the learning mode when directed by the user.

8. The method in claim 1, further comprising:

determining an alternative trajectory with a sweeping zigzag coverage of an area comprising both a left region and a right region of the trajectory;

directing the autonomous supply chain node vehicle to move along the alternative trajectory; and updating the virtual image-code tape with a subset of the set of discrete overlapping images captured while on the alternative trajectory.

9. The method in claim 1, further comprising:

updating the virtual image-code tape with a subset of the set of discrete overlapping images captured during a period indicated by the user; and re-generating the virtual image-code tape with another subset of the set of discrete overlapping images captured during another period indicated by the user.

10. The method in claim 1, further comprising:

sharing the virtual image-code tape with at least one of another autonomous supply chain node vehicle and a mobile device communicatively connected with the autonomous supply chain node vehicle; and updating the virtual image-code tape jointly with at least one of the another autonomous supply chain node vehicle and the mobile device.

11. A central inventory server comprising:

a processor;

a memory communicatively connected with the processor;

a set of instructions to be executed through the processor using the memory to:

analyze a layout diagram of a storage center;

determine that the layout diagram includes a set of shelves;

determine a path in the layout diagram for a movement of an autonomous supply chain node vehicle in the storage center avoiding the set of shelves, with a number of portions of the path each locally parallel to and within a distance constraint with respect to an adjacent shelf;

communicatively connect with and direct the autonomous supply chain node vehicle to:

capture a training set of discrete overlapping images of the peripheral area along the path with an imaging device on the autonomous supply chain node vehicle, capture an operating set of discrete overlapping images of the peripheral area around the autonomous supply chain node vehicle with the imaging device, and move with respect to the path, based on a current position of the autonomous supply chain node vehicle;

process the training set of discrete overlapping images jointly with the autonomous supply chain node vehicle to generate a virtual image-code tape capturing a continuous area of the storage center with a set of globally unique identifiers (GUIDs) associated with the peripheral area along the path;

wherein the set of GUIDs comprises identifiable image features associated with the training set of discrete overlapping images and a set of spatial information of the identifiable image features in the storage center;

process the operating set of discrete overlapping images to compare associated identifiable image features with the set of GUIDs of the virtual image-code tape to determine the current position of the autonomous supply chain node vehicle.

12. The central inventory server in claim 11, wherein:

the imaging device to capture at least one of:

down-view images of the floor with at least one of:

a set of floor artificial calibration marks, a set of floor artificial path road signs, and a set of floor texture marks comprising at least one of scratch marks, swirl marks, scuff marks, stains, grease traces, debris, dirt patterns, tape marks, footprints, shoeprints, dye marks, rubber marks, depression marks, junctions, floor cracks, wood grains, carpet textures, vinyl patterns, concrete grains, tile patterns, floor signages, floor arts, exposed hardware parts, shadows and shades, side-view images of the shelves and side walls with at least one of:

a set of side artificial calibration marks, a set of side artificial path road signs, and a set of side texture marks comprising at least one of shelves, structural features, wall texture, doors, windows, cables, furniture, tables, chairs, computers, air ducts, curtains, signages, boards, posters, displays, decorations, light fixtures, switches, shadows and shades, and up-view images of the ceiling with at least one of:

a set of ceiling artificial calibration marks, a set of ceiling artificial path road signs, and a set of ceiling texture marks comprising at least one of structural features, beam features, smoke marks, fume marks, fire sprinklers, bells, windows, fans, switches, cables, light fixtures, cameras, signages, air ducts, water pipes, tiles, vents, WiFi routers, projectors, shadows and shades.

13. The central inventory server in claim 11, wherein the set of instructions to further:

process any set of discrete overlapping images jointly with the autonomous supply chain node vehicle:

performing at least one of extraction, combination, representation, coding and comparing of associated identifiable image features, using at least one of feature extraction, edge detection, image matching, image fusion, image stitching, image sprite forming, panoramic photography, feature encoding, feature compression, and robust processing, and using a set of processing parameters spatially varying according to at least one of:

a position history of the autonomous supply chain node vehicle, a classification of the autonomous supply chain node vehicle, a state of the autonomous supply chain node vehicle, a type of the imaging device, a state of the imaging device, a type of an illuminating device, a state of the illuminating device, and a condition of the storage center; and accelerate the processing of a current captured image by:

comparing the current captured image with a set of past captured images that overlap with the current captured image, determining that the current captured image comprises:

an overlapping region that overlaps with any of the set of past captured images, and a corresponding non-overlapping region, determining that a subset of the set of GUIDs of the virtual image-code tape is associated with identifiable image features of the set of past captured images, generating a prediction of identifiable image features of the current captured image based on identifiable image features of the set of past captured images, the set of GUIDs of the virtual image-code tape, and the position history of the autonomous supply chain node vehicle, and performing simplified processing on the non-overlapping region and ultra-simplified processing on the overlapping region based on the prediction of identifiable image features of the current captured image.

14. The central inventory server in claim 11, wherein the set of instructions to further:

determine an alternative path for the autonomous supply chain node vehicle with a sweeping zigzag coverage of an area comprising both a left region and a right region of the path;

direct the autonomous supply chain node vehicle to move along the alternative path;

update the virtual image-code tape jointly with the autonomous supply chain node vehicle, using at least one of:

a subset of the operating set of discrete overlapping images captured while on the alternative path, and a second subset of the operating set of discrete overlapping images captured during a second period indicated by a user; and re-generating the virtual image-code tape jointly with the autonomous supply chain node vehicle, using a third subset of the operating set of discrete overlapping images captured during a third period indicated by the user.

15. The central inventory server in claim 11, wherein the set of instructions to further:

share the virtual image-code tape with at least one of
another autonomous supply chain node vehicle and a
mobile device; and
update the virtual image-code tape jointly with at least
one of:
the autonomous supply chain node vehicle,
the another autonomous supply chain node vehicle, and
the mobile device.

16. An autonomous supply chain node vehicle, comprising:
a vehicle capable of moving;
an imaging device on the vehicle;
a processor;
a memory communicatively connected with the processor;
a set of instructions to be executed through the processor using the memory to:
communicatively connect with a central inventory server,
determine that a layout diagram of a storage center includes a set of furniture and fixtures,
determine a path in the layout diagram for a movement of the autonomous supply chain node vehicle in the storage center avoiding the set of furniture and fixtures,
capture a training set of discrete overlapping images of the peripheral area along the path with the imaging device,
process the training set of discrete overlapping images jointly with the central inventory server to generate a virtual image-code tape capturing a continuous area of the storage center with a set of globally unique identifiers (GUIDs) associated with the peripheral area along the path,
wherein the set of GUIDs comprises identifiable image features associated with the training set of discrete overlapping images and a set of spatial information of the identifiable image features in the storage center,
capture an operating set of discrete overlapping images of the peripheral area around the autonomous supply chain node vehicle with the imaging device,
process the operating set of discrete overlapping images jointly with the central inventory server to compare associated identifiable image features with the set of GUIDs of the virtual image-code tape to determine a current position of the autonomous supply chain node vehicle, and
move with respect to the path based on the current position of the autonomous supply chain node vehicle.

17. The autonomous supply chain node vehicle in claim 16, wherein:
the imaging device to capture at least one of:
down-view images of the floor with:
a set of floor artificial calibration marks,
a set of floor artificial trajectory road signs, and
a set of floor texture marks comprising scratch marks, swirl marks, scuff marks, stains, grease traces, debris, dirt patterns, tape marks, footprints, shoeprints, dye marks, rubber marks, depression marks, junctions, floor cracks, wood grains, carpet textures, vinyl patterns, concrete grains, tile patterns, floor signages, floor arts, exposed hardware parts, shadows and shades,
side-view images of the furniture, fixture, and side walls with:
a set of side artificial calibration marks,
a set of side artificial trajectory road signs, and
a set of side texture marks comprising shelves, furniture, fixtures, structural features, wall texture, doors, windows, cables, tables, chairs, computers, air ducts, curtains, signages, boards, posters, displays, decorations, light fixtures, switches, shadows and shades, and
up-view images of the ceiling with:
a set of ceiling artificial calibration marks,
a set of ceiling artificial trajectory road signs, and
a set of ceiling texture marks comprising fixtures, structural features, beam features, smoke marks, fume marks, fire sprinklers, bells, windows, fans, switches, cables, light fixtures, cameras, signages, air ducts, water pipes, tiles, vents, WiFi routers, projectors, shadows and shades.

18. The autonomous supply chain node vehicle in claim 16, wherein the set of instructions further to:
process any set of discrete overlapping images jointly with the central inventory server:
performing at least one of extraction, combination, representation, coding and comparing of associated identifiable image features,
using at least one of feature extraction, edge detection, image matching, image fusion, image stitching, image sprite forming, panoramic photography, feature encoding, feature compression, and robust processing, and
using a set of processing parameters spatially varying according to at least one of:
a location history of the autonomous supply chain node vehicle,
a classification of the autonomous supply chain node vehicle,
a state of the autonomous supply chain node vehicle,
a type of the imaging device,
a state of the imaging device,
a type of an illuminating device,
a state of the illuminating device, and
a condition of the storage center; and
accelerate the processing of a current captured image by:
comparing the current captured image with a set of past captured images that overlap with the current captured image,
determining that the current captured image comprises:
an overlapping region that overlaps with any of the set of past captured images, and
a corresponding non-overlapping region,
determining that a subset of the set of GUIDs of the virtual image-code tape is associated with identifiable image features of the set of past captured images,
generating a prediction of identifiable image features of the current captured image based on identifiable image features of the set of past captured images, the set of GUIDs of the virtual image-code tape and the location history of the autonomous supply chain node vehicle, and
performing simplified processing on the non-overlapping region and ultra-simplified processing on the overlapping region based on the prediction of identifiable image features of the current captured image.

19. The autonomous supply chain node vehicle in claim 16, wherein the set of instructions further to:

determine another path for the autonomous supply chain node vehicle with a sweeping zigzag coverage of an area comprising both a left region and a right region of the path;

move along the another path; and update the virtual image-code tape jointly with the central inventory server, using at least one of:

a subset of the operating set of discrete overlapping images captured while on the another trajectory, a second subset of the operating set of discrete overlapping images captured during a second period indicated by a user; and re-generate the virtual image-code tape jointly with the central inventory server, using a third subset of the operating set of discrete overlapping images captured during a third period indicated by the user.

20. The autonomous supply chain node vehicle in claim 16, wherein the set of instructions further to:

change from the normal mode to a cautious mode when a current subset of the operating set of discrete overlapping images is determined to be unfamiliar having significant mismatch between the associated identifiable image features and the set of GUIDs of the virtual image-code tape:

setting sensitivity level of the obstacle sensor to high, analyzing the current location based on at least one of the location history of the autonomous supply chain node vehicle, an estimated velocity of the autonomous supply chain node vehicle, the virtual image-code tape, the layout diagram, the set of artificial calibration marks, and the set of artificial trajectory road signs, and move at a slower pace based on the current location, the location analysis, and the path;

change from the cautious mode to a lost mode after operating in the cautious mode for a timeout period;

change from any one of the lost mode and the cautious mode to the normal mode when a subsequent subset of the operating set of discrete overlapping images is determined to be familiar having sufficient similarity between the associated identifiable image features and the set of GUIDs of the virtual image-code tape;

change from any one of the normal mode, the cautious mode, and the lost mode to the learning mode when directed by the user.

* * * * *